(12) United States Patent
Steiner et al.

(10) Patent No.: US 9,269,552 B2
(45) Date of Patent: Feb. 23, 2016

(54) ION DETECTORS AND METHODS OF USING THEM

(71) Applicants: Urs Steiner, Branford, CT (US); Daniel Robert Marshak, Weston, MA (US)

(72) Inventors: Urs Steiner, Branford, CT (US); Daniel Robert Marshak, Weston, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 14/082,512

(22) Filed: Nov. 18, 2013

(65) Prior Publication Data

US 2014/0151549 A1 Jun. 5, 2014

Related U.S. Application Data

(60) Provisional application No. 61/728,188, filed on Nov. 19, 2012, provisional application No. 61/732,865, filed on Dec. 3, 2012, provisional application No. 61/781,963, filed on Mar. 14, 2013.

(51) Int. Cl.
- *H01J 49/02* (2006.01)
- *H01J 43/18* (2006.01)
- *H01J 43/30* (2006.01)
- *G01T 1/208* (2006.01)

(52) U.S. Cl.
CPC ............... *H01J 49/025* (2013.01); *H01J 43/18* (2013.01); *H01J 43/30* (2013.01); *G01T 1/208* (2013.01)

(58) Field of Classification Search
CPC ......... H01J 43/30; H01J 49/025; H01J 43/04; H01J 43/18; G01T 1/208

USPC .............. 250/281, 288, 207; 313/533; 330/42
See application file for complete search history.

(56) References Cited

U.S. PATENT DOCUMENTS

| | | | |
|---|---|---|---|
| 3,003,065 A * | 10/1961 | Ketchledge | .................... 250/207 |
| 3,310,678 A | 3/1967 | Kylander | |
| 3,543,095 A | 11/1970 | Ensminger | |
| 3,614,646 A * | 10/1971 | Hansen | ........................... 330/59 |
| 3,765,776 A | 10/1973 | Bravenec | |
| 5,367,222 A * | 11/1994 | Binkley | ........................ 315/12.1 |
| 5,995,989 A * | 11/1999 | Gedcke et al. | ................. 708/300 |
| 6,841,936 B2 * | 1/2005 | Keller et al. | ................... 313/533 |
| 7,005,625 B1 * | 2/2006 | Mitchell | ........................ 250/207 |
| 7,030,355 B1 | 4/2006 | Bochenski | |
| 7,745,781 B2 * | 6/2010 | Steiner | .......................... 250/282 |
| 7,855,361 B2 | 12/2010 | Steiner | |
| 8,618,457 B2 * | 12/2013 | Wright | .......................... 250/207 |
| 2002/0070330 A1 | 6/2002 | Staton | |
| 2004/0016867 A1 * | 1/2004 | Milshtein et al. | ............. 250/207 |
| 2004/0094730 A1 | 5/2004 | Imai | |
| 2004/0232315 A1 * | 11/2004 | Streun et al. | ............. 250/214 VT |
| 2004/0232835 A1 * | 11/2004 | Keller et al. | ................... 313/533 |

(Continued)

OTHER PUBLICATIONS

ISR/WO for PCT/US13/70502 mailed on Apr. 25, 2014.

(Continued)

*Primary Examiner* — Wyatt Stoffa

(74) *Attorney, Agent, or Firm* — Rhodes IP PLC; Christopher R Rhodes

(57) ABSTRACT

Certain embodiments described herein are directed to ion detectors and systems. In some examples, the ion detector can include a plurality of dynodes, in which one or more of the dynodes are coupled to an electrometer. In other configurations, each dynode can be coupled to a respective electrometer. Methods using the ion detectors are also described.

21 Claims, 23 Drawing Sheets

(56) References Cited

U.S. PATENT DOCUMENTS

| | | |
|---|---|---|
| 2006/0043259 A1* | 3/2006 | Thompson .................... 250/207 |
| 2006/0230134 A1 | 10/2006 | Qian |
| 2007/0108973 A1 | 5/2007 | Lanning |
| 2009/0096505 A1 | 4/2009 | Wolters |
| 2009/0230285 A1* | 9/2009 | Wright .......................... 250/207 |
| 2010/0288933 A1 | 11/2010 | Duraj |
| 2011/0240857 A1* | 10/2011 | Kovtoun et al. ........... 250/336.1 |
| 2012/0032072 A1* | 2/2012 | Quarmby et al. ............. 250/282 |
| 2012/0175514 A1* | 7/2012 | Izumi ............................ 250/281 |
| 2012/0205534 A1 | 8/2012 | Hunter |
| 2014/0151529 A1* | 6/2014 | Steiner et al. ................. 250/207 |
| 2014/0239177 A1* | 8/2014 | Kovtoun et al. ........... 250/336.1 |

OTHER PUBLICATIONS

IPRP for PCT/US2013/070526.

* cited by examiner

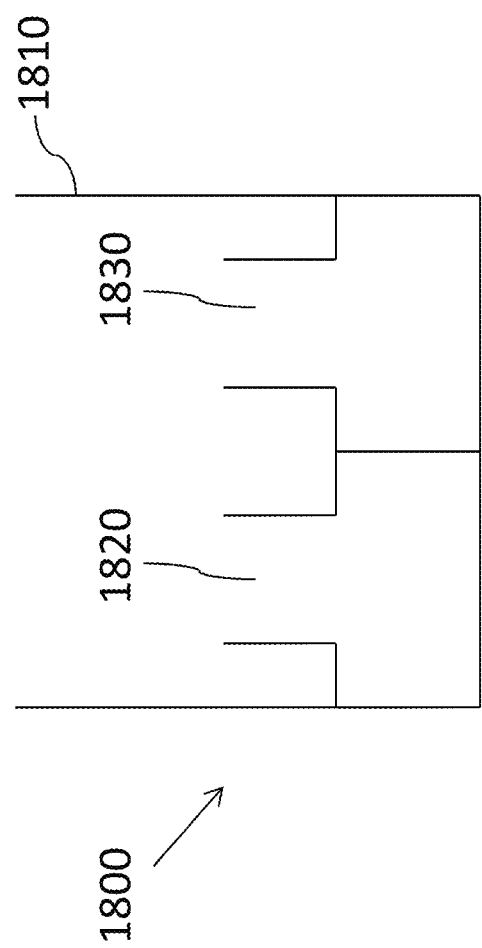

ION DETECTORS AND METHODS OF USING THEM

PRIORITY APPLICATIONS

This application claims priority to each of U.S. Patent Application No. 61/728,188 filed on Nov. 19, 2012, to U.S. Patent Application No. 61/732,865 filed on Dec. 3, 2012 and to U.S. Patent Application No. 61/781,963 filed on Mar. 14, 2013, the entire disclosure of each of which is hereby incorporated herein by reference for all purposes.

TECHNOLOGICAL FIELD

Certain features, aspects and embodiments are directed to ion detectors and methods of using them. In some instances, the ion detector can be configured to amplify a signal using a plurality of dynodes.

BACKGROUND

In many instances it is often desirable to detect ions. Ions signals are often amplified using an electron multiplier to permit their detection.

SUMMARY

Certain aspects described herein are directed to detectors that can receive ions, measure signals from analog dynode stages and can shunt or shut down dynodes downstream of a saturated dynode to protect the dynodes of the detector. In some configurations, the detector is configured to function without any pulse counting, e.g., comprises only analog stages and no pulse counting stage or pulse counting electrode, and may measure a plurality of analog signals, scale each signal and average the signals. By measuring the input or output current to multiple dynodes, and shutting down high current dynodes, the dynamic range of the detector can be extended and linearity can be improved. The various measured dynodes may be electrically isolated from each other so that separate signals can be measured or detected. In some instances, the circuitry for each dynode may be electrically isolated or electrically insulated from the circuitry of other dynodes to permit measurement of each dynode or a desired number of dynodes. For example, supply currents at each dynode (or selected dynodes) can be measured and used to determine an ion level, and the detector can terminate signal amplification at a measured, saturated dynode to protect dynodes downstream of the saturated dynode.

In a first aspect, a mass spectrometer comprising a sample introduction system, an ion source fluidically coupled to the sample introduction system, a mass analyzer fluidically coupled to the ion source, and a detector fluidically coupled to the mass analyzer is provided. In certain configurations, the detector comprises an electron multiplier comprising a plurality of dynodes each electrically coupled to a respective electrometer.

In certain embodiments, the mass spectrometer comprises a first processor electrically coupled to each electrometer. In other embodiments, the first processor is configured to measure the input or output current at each respective dynode. In some examples, the first processor is configured to calculate a mean input current using received input current signals and using the gain of the respective dynode. In other examples, the first processor is configured to calculate a gain between consecutive dynodes by comparing a current, e.g., input or output current, of the first dynode to a current, e.g., input or output current, of a dynode immediately upstream of the first dynode. In some examples, each electrometer is electrically coupled to a signal converter to provide simultaneous signals, e.g., digital signals, to the processor from each of the plurality of dynodes. In further examples, the signal converter comprises an analog-to-digital converter or an ion pulse counter or other suitable signal converters. In some embodiments, the detector further comprises a respective power converter electrically coupled to each electrometer and converter pair. In other examples, the first processor is configured to measure all dynode currents simultaneously. In some embodiments, the detector (or first processor or both) is configured to prevent a current overload at each dynode.

In certain configurations, the detector (or first processor or both) is configured to alter the voltage of a saturated dynode (relative to a previous, upstream dynode), to reduce its electron gain to the previous dynode, and/or reduce the ion current for downstream dynodes. In some embodiments, the detector (or first processor or both) is configured to invert the polarity of the voltage to the previous dynode or to a subsequent dynode or both. In other embodiments, the detector (or first processor or both) is configured to prevent any substantial secondary electron emission to a downstream dynode adjacent to the dynode where the saturation current is detected. In some examples, voltage of the electron multiplier is not adjusted between measuring species having different mass-to-charge ratios. In certain embodiments, the gain of the electron multiplier is constant. In other embodiments, gain of the electron multiplier is not user adjustable. In some examples, the electron multiplier is configured to provide independent voltage control at each dynode of the plurality of dynodes. In further examples, dynode to dynode voltage can be regulated to keep the voltage substantially constant (or constant) while allowing variable the input or output current of each dynode. In certain examples, dynamic range of ion current measurements is greater than $10^8$, $10^9$ or $10^{10}$ when measuring the ion current at a rate of 100 kHz. In other embodiments, the signal from every electrometer is used by the first processor to calculate a mean electron multiplier input current. In some embodiments, the first processor is configured to calculate the mean electron multiplier input current by calculating the input currents of the dynode signals which are above a minimum noise threshold and below a maximum saturation threshold.

In an additional aspect, a mass spectrometer comprising a sample introduction system, an ion source fluidically coupled to the sample introduction system, a mass analyzer fluidically coupled to the ion source, and a detector fluidically coupled to the mass analyzer, in which the detector comprises a plurality of continuous electron multiplier sections, e.g., where each comprise a plurality of dynodes, in which at least one section of the plurality of dynodes is electrically coupled to an electrometer is described.

In certain embodiments, the mass spectrometer comprises at least one additional electrometer electrically coupled to one of the plurality of dynodes. In some embodiments, a first processor is electrically coupled to each electrometer and is configured to measure a current, e.g., input or output current, into/from each respective dynode. In certain examples, at least one dynode without a respective electrometer is positioned between dynodes that are electrically coupled to an electrometer. In some examples, one or more of the sections may comprise a plurality of electrometers, in which every other dynode is electrically coupled to an electrometer. In certain examples, one or more sections comprise a plurality of electrometers, in which every third dynode electrically coupled to an electrometer. In some embodiments, one or more sections comprise a plurality of electrometers, in which every fourth dynode electrically coupled to an electrometer. In other embodiments, the one or more sections comprise a plurality of electrometers, in which every fifth dynode electrically coupled to an electrometer. In some embodiments, each electrometer is electrically coupled to a signal converter. In other examples, each electrometer is electrically coupled to an analog-to-digital converter, an ion pulse counter or other suitable converters to provide, for example, simultaneous digital signals to the processor from each of the dynodes electrically coupled to an electrometer. In certain examples, the processor is configured to provide a mean digital signal representative of the concentration of the sample using the simultaneous digital signals. In some examples, the mass spectrometer comprises a processor electrically coupled to the plurality of dynodes and configured to prevent a current overload at one or more dynodes or at each dynode. In certain examples, the detector (or processor or both) is configured to alter the voltage of a saturated dynode (relative to a previous dynode) to reduce its electron gain to the previous dynode and reduce the ion current for other downstream dynodes. In some embodiments, gain (or voltage) of the electron multiplier is not adjusted between measuring species having different mass-to-charge ratios. In other embodiments, the gain of the electron multiplier is constant or not user adjustable. In some examples, the electron multiplier is configured to provide independent voltage control at each dynode of the plurality of dynodes. In certain examples, dynode to dynode voltage is regulated to keep the voltage substantially constant (or constant). In other examples, dynamic range of ion current measurement is greater than $10^8$, $10^9$, or $10^{10}$ when measuring the ion current at a rate of 100 kHz. In some examples, the signal from every electrometer is used by the processor to calculate a mean electron multiplier input current. In additional examples, the first processor is configured to calculate the mean electron multiplier input current by calculating the input currents of dynode signals which are above a minimum noise threshold and below a maximum threshold, e.g., by discarding input currents below a noise current and above a saturation current. In some embodiments, the first processor is configured to scale each non-discarded calculated input current using the respective electron multiplier gain and average the scaled input currents to provide the mean electron multiplier input current.

In another aspect, a detector comprising an electron multiplier comprising a plurality of dynodes each configured to electrically couple to a respective electrometer is described. In some embodiments, the plurality of dynodes and the electrometers are in the same housing. In other embodiments, each electrometer is electrically coupled to a respective signal converter. In some examples, each of the respective signal converters is an analog-to-digital converter. In some examples, each of the respective signal converters is an ion pulse counter or other suitable signal converter. In further examples, each of the analog-to-digital converters or ion pulse counters is configured to transmit its data in an electrically isolated manner to a first processor. In some embodiments, the detector comprises a respective power converter electrically coupled to each electrometer and analog-to-digital converter pair. In some configurations, for one or more dynodes, e.g., each dynode, the electrometer and the converter can be at substantially the same electrical potential, e.g., where the processor is at ground potential. In certain embodiments, the detector comprises a processor electrically coupled to each of the plurality of dynodes and configured to prevent a current overload at each dynode. In other examples, the processor is configured to alter the voltage at, upstream or downstream of a dynode where a saturation current is detected. In some examples, the processor is configured to invert the polarity of a voltage of the downstream dynode. In further examples, the first processor is configured to prevent any substantial secondary electron emission to a downstream dynode adjacent to the dynode where a saturation current is detected.

In an additional aspect, a detector comprising an electron multiplier comprising a plurality of dynodes each electrically coupled to a respective electrometer configured to provide an output signal is described. In certain embodiments, the plurality of dynodes and the electrometers are in the same housing. In other embodiments, each electrometer is electrically coupled to a respective signal converter. In some embodiments, each of the respective signal converters is an analog-to-digital converter, an ion pulse counter or other suitable signal converter. In further examples, each of the analog-to-digital converters is configured to electrically couple to a first processor, e.g., in an electrically isolated manner. In some examples, the detector comprises a respective power converter electrically coupled to each electrometer and signal converter pair. In further examples, the detector comprises a first processor electrically coupled to each of the plurality of dynodes and configured to prevent a current overload at each dynode. In some embodiments, the processor is configured to alter the voltage of a saturated dynode (relative to a previous dynode) to reduce its electron gain to the previous dynode and reduce the ion current for other downstream dynodes. In certain examples, the processor is configured to invert the polarity of the voltage to the previous dynode or to a downstream dynode or both. In some examples, the processor is configured to prevent any substantial secondary electron emission to a downstream dynode adjacent to a dynode where a saturation current is detected.

In another aspect, a detector comprising a single-stage electron multiplier comprising a plurality of dynodes, in which at least one internal dynode of the plurality of dynodes is configured to electrically couple to an electrometer is provided In some examples, at least two of the internal dynodes of the plurality of dynodes are configured to electrically couple to a respective electrometer. In other examples, every other dynode of the plurality of dynodes is configured to electrically couple to a respective electrometer. In further examples, every third dynode of the plurality of dynodes is configured to electrically couple to a respective electrometer. In some embodiments, the electrometer is configured to electrically couple to a signal converter. In certain embodiments, the signal converter is an analog-to-digital converter, an ion pulse counter or other suitable signal converters. In certain examples, the detector comprises a power converter electrically coupled to the electrometer and to the signal converter. In some embodiments, the detector comprises a first processor electrically coupled to each of the plurality of dynodes (e.g., where each dynode is electrically isolated from other dynodes to provide separate signals to the processor) and configured to prevent a current overload at each dynode. In some examples, the processor is configured to measure all dynode currents simultaneously. In certain examples, the processor is configured to alter the voltage at a saturated dynode (relative to the previous dynode) to reduce its electron gain to the previous dynode and reduce the ion current for downstream dynodes.

In an additional aspect, a detector comprising a single-stage electron multiplier comprising a plurality of dynodes, in which at least one internal dynode of the plurality of dynodes is electrically coupled to an electrometer is provided. In certain embodiments, at least two of the internal dynodes of the plurality of dynodes are electrically coupled to a respective electrometer. In other embodiments, every other dynode of the plurality of dynodes is electrically coupled to a respective electrometer. In some examples, every third dynode of the plurality of dynodes is electrically coupled to a respective electrometer. In additional examples, the electrometer is electrically coupled to a signal converter. In further examples, the signal converter is an analog-to-digital converter, an ion pulse counter or other suitable signal converters. In other embodiments, the detector comprises a power converter electrically coupled to the electrometer and to the signal converter. In some embodiments, the detector comprises a processor electrically coupled to each of the plurality of dynodes and configured to prevent a current overload at each dynode. In other embodiments, the processor is configured to measure all dynode currents simultaneously. In some examples, the processor is configured to alter the voltage at a saturated dynode (relative to a previous dynode) to reduce its electron gain to the previous dynode and reduce the ion current for dynodes downstream of the saturated dynode.

In another aspect, a method of detecting ions comprising simultaneously detecting a current signal (an input current signal or output current signal) at each dynode of a plurality of dynodes of an electron multiplier configured to receive ions, and averaging the detected current signals at each dynode comprising a measured current signal above a noise current signal and below a saturation current signal to determine a mean electron multiplier current is provided. In certain examples, the method comprises terminating signal amplification at a dynode where a saturation current is detected/measured or at a dynode upstream where the saturation current is measured. In other examples, the method comprises altering the voltage at a downstream dynode adjacent to the dynode where the saturation current is measured to terminate the signal amplification. In certain configurations, the method comprises altering the voltage at an upstream dynode adjacent to the dynode where the saturation current is measured to terminate the signal amplification. In some embodiments, the method comprises calculating the mean current by calculating the currents at all dynodes and discarding calculated currents below the noise current signal and above the saturation current signal. The method may also include scaling each non-discarded calculated current by its respective electron multiplier gain and averaging the scaled currents to provide the mean electron multiplier current. In certain embodiments, the method comprises providing a floating voltage to each dynode of the plurality of dynodes. In other embodiments, the method comprises controlling the voltage at each dynode independently of voltage at the other dynodes of the plurality of dynodes. In some examples, the method comprises measuring the ions without adjusting the voltage of the electron multiplier. In further examples, the method comprises measuring a plurality of ions comprising different mass-to-charge ratios without adjusting the voltage of the electron multiplier. In other examples, the method comprises calculating the amount of ions of a selected mass-to-charge ratio using the calculated mean current. In certain embodiments, the method comprises calculating the amount of ions per second of a selected mass-to-charge ratio using the calculated mean current.

In an additional aspect, a method of detecting ions comprising simultaneously detecting a current signal (input current signal or output current signal) of at least two internal dynodes of a plurality of dynodes of an electron multiplier configured to receive ions, and averaging the detected current signals at each of the at least two internal dynodes comprising a measured current signal above a noise current signal and below a saturation current signal to determine a mean electron multiplier input current is disclosed. In certain embodiments, the method comprises terminating signal amplification at a dynode where a saturation current is measured. In other embodiments, the method comprises simultaneously detecting a current signal (input current signal or output current signal) at every other internal dynode of the plurality of dynodes. In further embodiments, the method comprises simultaneously detecting a current signal at every third internal dynode of the plurality of dynodes. In additional examples, the method comprises terminating signal amplification at a dynode where a saturation current is measured. In some embodiments, the method comprises providing a floating voltage at each detected dynode of the plurality of dynodes. In other embodiments, the method comprises controlling the voltage at each dynode independently of voltage at the other dynodes of the plurality of dynodes. In some examples, the method comprises measuring the ions without adjusting the gain of the electron multiplier. In additional embodiments, the method comprises calculating the mean input current by calculating the input currents at selected dynodes and discarding calculated input currents below the noise current input signal and above the saturation current input signal, and scaling each non-discarded calculated input current by its respective electron multiplier gain and averaging the scaled input currents to provide the mean electron multiplier input current. In other examples, the method comprises configuring the dynamic range of ion current measurement is greater than $10^{10}$ when reading the ion current at a rate of 100 kHz.

In another aspect, a method of detecting ions comprising simultaneously detecting an input current signal (or output current signal) of at least two internal dynodes of an electron multiplier configured to receive ions, and averaging the detected input current signals at each of the at least two internal dynodes comprising a measured current input signal above a noise current input signal and below a saturation current input signal to determine a mean input current is disclosed. In certain examples, the method comprises terminating signal amplification at a dynode where a saturation current is measured or terminating signal amplification at a dynode immediately upstream or downstream of where a saturation current is measured. In other examples, the method comprises simultaneously detecting an input current signal (or output current signal) at every other internal dynode of the plurality of dynodes. In further examples, the method comprises simultaneously detecting an input current signal (or output current signal) at every third internal dynode of the plurality of dynodes. In some embodiments, the method comprises terminating signal amplification at a dynode where a saturation current is measured. In certain embodiments, the method comprises providing a floating voltage at each detected dynode of the plurality of dynodes. In other embodiments, the method comprises controlling the voltage at each dynode independently of voltage at the other dynodes of the plurality of dynodes. In further examples, the method comprises measuring ions having a different mass-to-charge ration without adjusting the voltage of the electron multiplier. In additional embodiments, the method comprises scanning a range of ions of different mass-to-charge ratio without adjusting the gain of the electron multiplier. In certain embodiments, the method comprises calculating a sample concentration from the determined mean current. In other embodiments, the method comprises determining the mean current by calculating the currents at selected dynodes and discarding calculated currents below the noise current signal and above the saturation current signal, and scaling each non-discarded calculated current by its respective gain and averaging the scaled currents to determine the mean current.

In an additional aspect, a method of measuring ions comprising separately controlling a bias voltage in each dynode of an electron multiplier comprising a plurality of dynodes is provided. In some embodiments, the separately controlling the bias voltage in each dynode comprises regulating the dynode voltage to be substantially constant with increasing electron current and/or while allowing variable input/output currents at each dynode. In other embodiments, the method comprises calculating currents (input currents or output currents) at selected dynodes of the plurality of dynodes, discarding calculated currents below a noise current level and above the saturation current level (or using current from dynodes which are above a minimum noise threshold and below a maximum saturation threshold), scaling each non-discarded calculated current by its respective gain, and averaging the scaled currents to determine a mean current.

In another aspect, a method of analyzing a sample comprising amplifying an ion signal from the sample by independently measuring a current (input current or output current) at each of a plurality of dynodes of an electron multiplier is provided. In certain examples, the method comprises calculating currents at each dynode of the plurality of dynodes, discarding calculated currents below a noise current level and above the saturation current level (or using current from dynodes which are above a minimum noise threshold and below a maximum saturation threshold), scaling each non-discarded calculated current by its respective gain, and averaging the scaled currents to determine a mean current.

In an additional aspect, a method of analyzing a sample comprising amplifying an ion signal from the sample by independently measuring a current (input current or output current) at two or more of a plurality of dynodes in an electron multiplier comprising a plurality of dynodes is described. In some examples, the method comprises calculating currents at each of the two or more dynodes of the plurality of dynodes, discarding calculated currents below a noise current level and above the saturation current level (or using current from dynodes which are above a minimum noise threshold and below a maximum saturation threshold), scaling each non-discarded calculated current by its respective gain, and averaging the scaled currents to determine a mean current. In some embodiments, the method comprises measuring currents from every other dynode of the plurality of dynodes.

In another aspect, a system comprising a plurality of dynodes, at least one electrometer electrically coupled to one of the plurality of dynodes, and a first processor electrically coupled to the at least one electrometer, the processor configured to determine a mean current (mean input current or mean output current) from current measurements measured by the electrometer is provided. In certain embodiments, the first processor is configured to determine the mean current by calculating currents at the at least one dynode of the plurality of dynodes, discarding calculated currents below a noise current level and above the saturation current level (or using current from dynodes which are above a minimum noise threshold and below a maximum saturation threshold), scaling each non-discarded calculated current by its respective gain, and averaging the scaled currents to determine a mean current. In other embodiments, the system comprises a second electrometer electrically coupled to a dynode other than the dynode electrically coupled to the electrometer. In some embodiments, the processor is configured to determine the mean input current by calculating input currents at the dynode electrically coupled to the electrometer and at the dynode electrically coupled to the second electrometer, discarding calculated currents below a noise current level and above the saturation current level (or using current from dynodes which are above a minimum noise threshold and below a maximum saturation threshold), scaling each non-discarded calculated current by its respective gain, and averaging the scaled currents to determine a mean current. In other embodiments, each of the plurality of dynodes is electrically coupled to a respective electrometer. In additional embodiments, the processor is configured to determine the mean current by calculating currents at each dynode of the plurality of dynodes, discarding calculated currents below a noise current input level and above the saturation current level (or using current from dynodes which are above a minimum noise threshold and below a maximum saturation threshold), scaling each non-discarded calculated current by its respective gain, and averaging the scaled currents to determine a mean current.

Additional attributes, features, aspects, embodiments and configurations are described in more detail herein.

BRIEF DESCRIPTION OF THE FIGURES

Certain features, aspects and embodiments of the signal multipliers are described with reference to the accompanying figures, in which:

FIG. 18 is an example of a camera, in accordance with certain examples;

Figure 1:
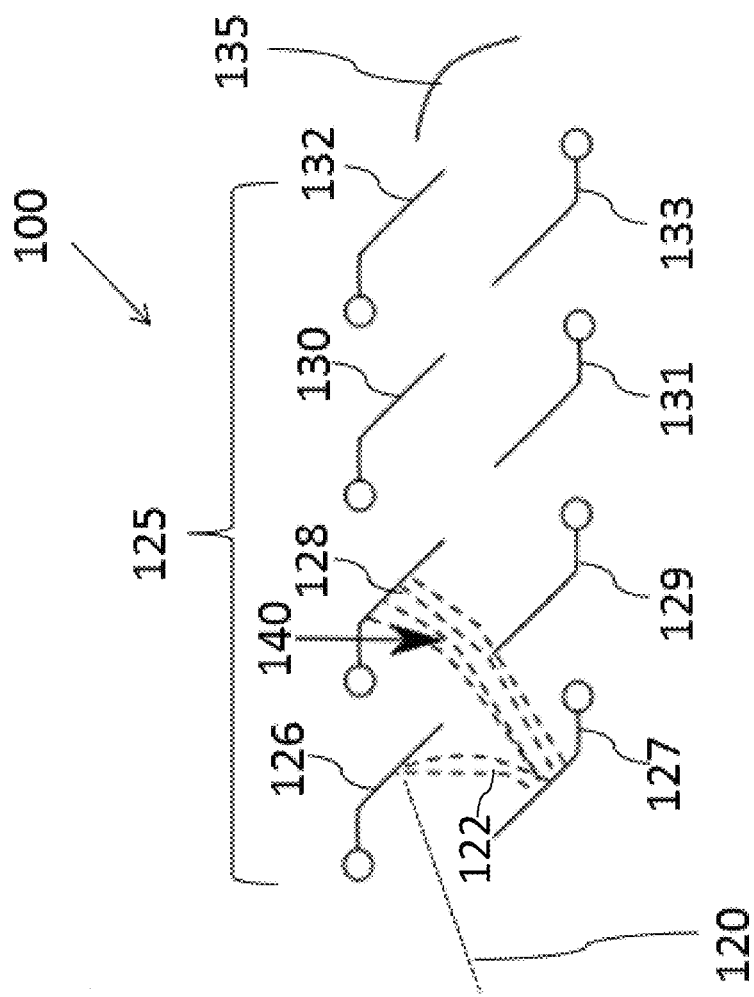
FIG. 1 is an illustration of a detector comprising a plurality of dynodes, in accordance with certain examples.

It will be recognized by the person of ordinary skill in the art, given the benefit of this disclosure, that the components in the figures are not limiting and that additional components may also be included without departing from the spirit and scope of the technology described herein.

DETAILED DESCRIPTION

Certain features, aspects and embodiments described herein are directed to ion detectors and systems using them that can receive incident ions, amplify a signal corresponding to the ions and provide a resulting current or voltage. In some embodiments, the ion detectors and systems described herein can have an extended dynamic range, accepting large electron currents, without damaging or prematurely aging the device. In other instances, the ion detectors and systems may be substantially insensitive to overloading or saturation effects as a result of high concentrations (or high amounts of ions emitted or otherwise provided to the ion detector) while still providing rapid acquisition times and accurate measurements.

In some embodiments, the dynodes of the ion detectors described herein can be used to measure signals, e.g., signals representative of the incident ions, in a manner that does not overload the dynodes. For example, the detectors can be configured such that dynodes downstream of a saturated dynode are "shorted out" or not used in the amplification. This configuration can increase the lifetime of the ion detectors and can permit use of the ion detectors over a wide concentration range of ion current without having to alter or adjust the gain of the ion detectors for each sample. For example, the voltage (or current) of each dynode can be monitored and/or used to measure the signal. If desired, dynodes that provide a signal above a noise level and/or below a saturation level can be monitored and grouped together, e.g., to provide a mean signal that can be used to determine concentration, ions per second or otherwise provide a desired output, e.g., an image, that corresponds to the incident light. Where dynode saturation is measured, signal amplification can be terminated at dynodes downstream of the saturated dynode, or optionally at the saturated dynode itself, to enhance the lifetime of the ion detectors and systems. Reference to the terms "upstream" and "downstream" is understood to refer to the position of one dynode relative to another dynode. For example, a dynode of a detector that is immediately adjacent to an entry aperture of the detector would be upstream of a dynode that is immediately adjacent to an exit aperture of the detector. Similarly, a dynode that is immediately adjacent to the exit aperture would be downstream of a dynode that is immediately adjacent to the entry aperture.

In certain embodiments, the ion detectors and systems described herein have wide applicability to many different types of devices including, but not limited to, ion detectors of medical and chemical instrumentation, e.g., mass spectrometry, radiation detectors, Faraday cups, Geiger counters, scintillation counters and other devices which can receive ions and amplify ion signals to provide a current (or voltage), image or signal representative of incident ions. The devices may be used with, or may include, one or more scintillators, primary emitters, secondary emitters or other materials to facilitate ion detection and/or use of the ions to provide an image. Visual imaging components can be used with the measured signals to construct images representative of the ions received by the detectors and systems described herein. Examples of these and other ion detectors and systems are described in more detail below.

Certain figures are described below in reference to devices including dynodes or dynodes stages. It will be recognized by the person of ordinary skill in the art, given the benefit of this disclosure, that the exact number of dynodes or dynode stages can vary, e.g., from 5 to 30 or any number in between or other numbers of dynode stages greater than 30, depending on the desired signal amplification, the desired sensitivity of the device and other considerations. In addition, where reference is made to channels, e.g., channels of a microchannel plate device, the exact number of channels may also vary as desired. In some configurations, the dynodes may be present in a continuous dynode device.

In certain embodiments and referring to FIG. 1, certain components of an ion detector 100 are shown. The detector 100 comprises an optional collector (or anode) 135 and a plurality of dynodes 125-133 upstream of the collector 135. While not shown, the components of the detector 100 would typically be positioned within a tube or housing (under vacuum) and may also include a focusing lenses or other components to provide the ion beam 120 to the first dynode 126 at a suitable angle. In use of the detector 100, ion beam 210 is incident on the first dynode 126, which converts the ion signal into an electrical signal shown as beam 122 by way of the photoelectric effect. In some embodiments, the dynode 126 (and dynodes 127-133) can include a thin film of material on an incident surface that can receive ions and cause a corresponding ejection of electrons from the surface. The energy from the ion beam 120 is converted by the dynode 126 into an electrical signal by emission of electrons. The exact number of electrons ejected per ion depends, at least in part, on the work function of the material and the energy of the incident ion. The secondary electrons emitted by the dynode 126 are emitted in the general direction of downstream dynode 127. For example, a voltage-divider circuit (as described below), or other suitable circuitry, can be used to provide a more positive voltage for each downstream dynode. The potential difference between the dynode 126 and the dynode 127 causes electrons ejected from the dynode 126 to be accelerated toward the dynode 127. The exact level of acceleration depends, at least in part, on the gain used. Dynode 127 is typically held at a more positive voltage than dynode 126, e.g., 100 to 200 Volts more positive, to cause acceleration of electrons emitted by dynode 126 toward dynode 127. As electrons are emitted from the dynode 127, they are accelerated toward downstream dynode 128 as shown by beams 140. A cascade mechanism is provided where each successive dynode stage emits more electrons than the number of electrons emitted by an upstream dynode. The resulting amplified signal can provided to the optional collector 135, which typically outputs the current to an external circuit through one or more electrical couplers of the ion detector 100. The current measured at the collector 135 can be used to determine the amount of ions that arrive per second, the amount of a particular ion, e.g., a particular ion with a selected mass-to-charge ratio, that is present in the sample or other attributes of the ions. If desired, the measured current can be used to quantitate the concentration or amount of ions using conventional standard curve techniques. In general, the detected current depends on the number of electrons ejected from the dynode 126, which is proportional to the number of incident ions and the gain of the device 100. Gain is typically defined as the number of electrons collected at the collector 135 relative to the number of electrons ejected from the dynode 126. For example, if 5 electrons are emitted at each dynode, and the device 100 includes 8 total dynodes, then the gain is $5^8$ or about 390,000. The gain is dependent on the voltage applied to the device 100. For example, if the voltage is increased, the potential differences between dynodes are increased, which results in an increase in incident energy of electrons striking a particular dynode stage.

In some embodiments, the ion detector 100 can be overloaded by permitting too many ions to be introduced into the housing and/or by adjusting the gain to be too high. As noted above, the gain of existing ion detectors can be adjusted by changing or adjusting a control voltage to provide a desired signal without saturation of the detector. For example, the operating voltage of a typical detector may be between 800-3000 Volts. Changing the operating voltage can result in a change in the gain. Typical gain values may be from about $10^5$ to about $10^8$. For any given gain, the detector has a useful dynamic range, which is limited by saturation at the high current end and detector noise in case of low input current. The gain adjustment often takes place from sample to sample to avoid overloading the detector at high sample concentrations (or high amounts of ions) and to avoid not providing enough signal amplification at low concentrations of sample (or low levels of incident ions). Alternatively, a gain can be selected (by selecting a suitable operating voltage) so that varying levels of ion current at different mass-to-charge ratios do not saturate the detector. Adjusting the gain from measurement-to-measurement or image-to-image increases sampling time, can reduce detector response time and may lead to inaccurate results. Where the gain is too high, the detector can become overloaded or saturated, which can result in reduced lifetime for the detector and provide substantially inaccurate measurements. Where the gain is too low, low levels of ions may go undetected. In certain embodiments described herein, the gain of the detector can be kept constant and can be rendered insensitive to saturation or overloading at high levels or the amounts of ions entering into the detector. Instead, the current to selected dynode stages can be measured, reflecting the ion current difference of incoming electrons to leaving electrons. These readings can be used to determine whether or not the electron current should be extracted at the next stage below, which can stop all electron current flow to the lower dynodes, i.e. downstream dynodes. The measured current at selected dynode stages can be scaled by their stage gain and then averaged or otherwise used to determine a mean input current signal that is representative of the concentration or amount of ions that arrives at the detector. Illustrations of such processes are described in more detail below.

In certain embodiments, each of the dynodes 126-133 (and collectively shown as element 125) of the ion detector 100 can be configured to electrically couple to an electrometer so that a current (input current or output current) at each of the plurality of dynodes 125 can be monitored or measured. In some configurations, the voltage difference between each dynode may be around 100 to 200V. As described elsewhere herein, the electrometer may part of an analog circuit or a digital circuit. For example, a solid-state amplifier comprising one or more field-effect transistors can be used to measure the current at each of the plurality of dynodes 126-133. In some instances, each of the plurality of dynodes 126-133 may include a respective solid-state amplifier. If desired, the amplifier can be coupled to one or more signal converters, processors or other electrical components. In combination, the components may provide or be considered a microcontroller comprising one or more channels, e.g., ADC channels. In some embodiments, a single microprocessor can be electrically coupled to one, two or more, e.g., all, of the dynodes such that current values can simultaneously be provided to the processor for the one, two or more, e.g., all, dynodes. Because of the different dynode voltages, the current values can be provided by way of some means of electrically isolating the various signals from each dynode, e.g., optocouplers, inductors, light pipe, IRF devices or other components can be used. For example, each dynode/electrometer pair can be electrically isolated and/or electrically insulated from other dynode/electrometer pairs such that separate signals can be measured from each of the dynodes. In other configurations, a processor electrically coupled to suitable components (as described herein) can monitor current levels at each dynode and can be used to determine a mean input current for determining a concentration of a sample or for constructing an image based on the determined inputs.

Figure 2:
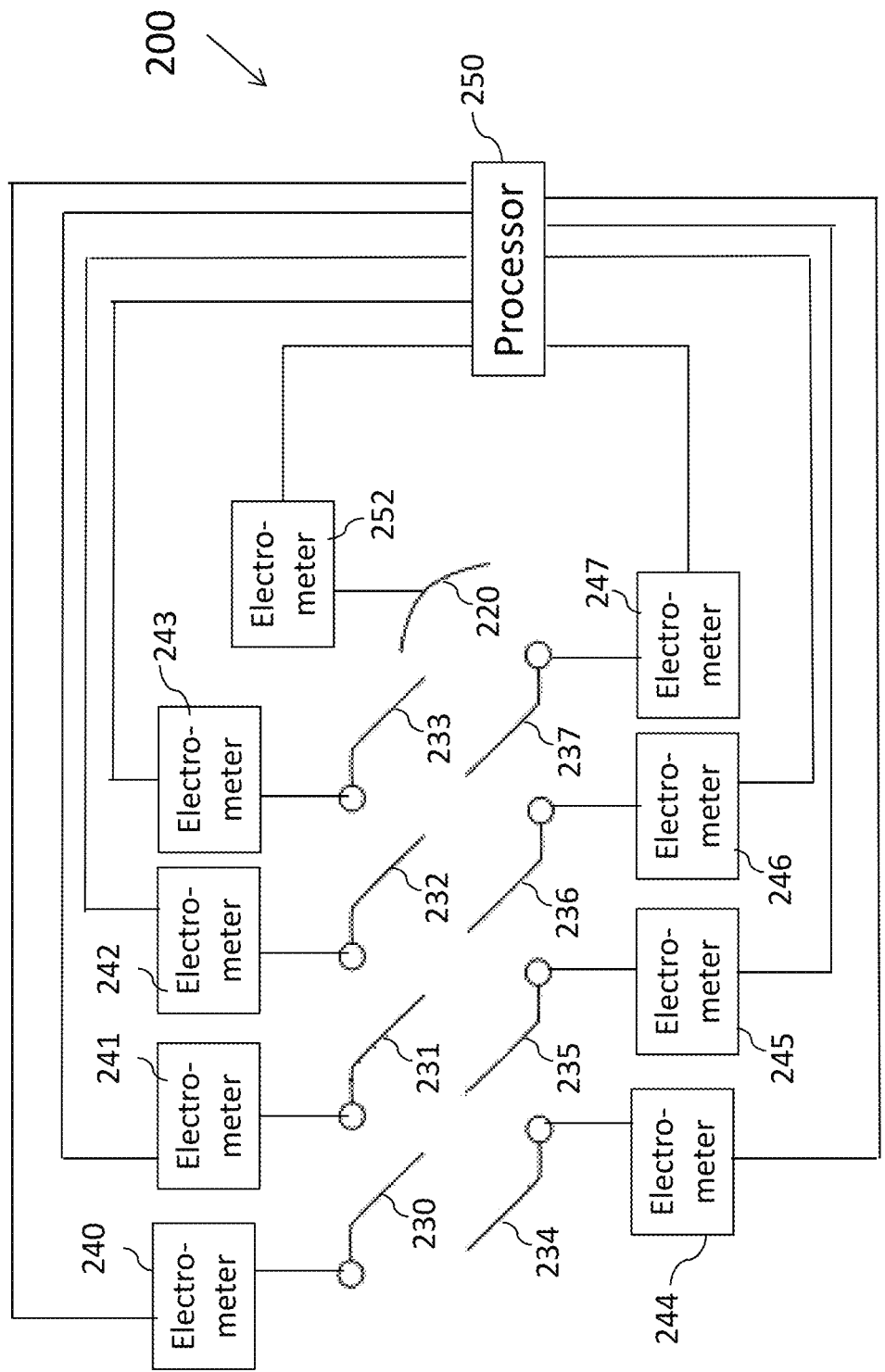
FIG. 2 is an illustration of a detector where each dynode is electrically coupled to an electrometer, in accordance with certain examples; The processor is not connected to the dynode, all electrometer's need to show an insulated connection to the processor, all electrometer's need to show a bias power supply connection.

In certain embodiments and referring to FIG. 2, one configuration of certain components in an ion detector system is shown. In FIG. 2, an ion detector 200 comprises a plurality of dynodes stages 230-237 and an optional collector 220, where though the collector 220 can be omitted and the last dynode 237 may be the terminal dynode. In the detector 200, each of the dynode stages 230-237 is electrically coupled to a respective electrometer 240-247. The electrometers 240-247 can each be electrically coupled to a first processor 250, e.g., through separate input channels (not shown) of the processor 250. If desired, the collector 220 can also be electrically coupled to an optional electrometer 252. In certain instances, it may be desirable to switch operation of the detector 200 from the state where one or more internal dynode currents are monitored to a second state where only current at the collector 237 is monitored. Even where a collector 220 is present, the collector is typically positioned so far downstream that current output is measured upstream of the collector 220, e.g., current output is measured at dynode 237 or a dynode upstream of dynode 237. As noted herein, the processor 250 may be present on a printed circuit board, which may include other components commonly found on printed circuit boards including, but not limited to, I/O circuits, data buses, memory units, e.g., RAM, clock generators, support integrated circuits and other electrical components. While not shown, the dynodes/electrometer pairs of the detector 200 may be electrically isolated from each other to provide separate signals to the first processor 250.

Figure 3:
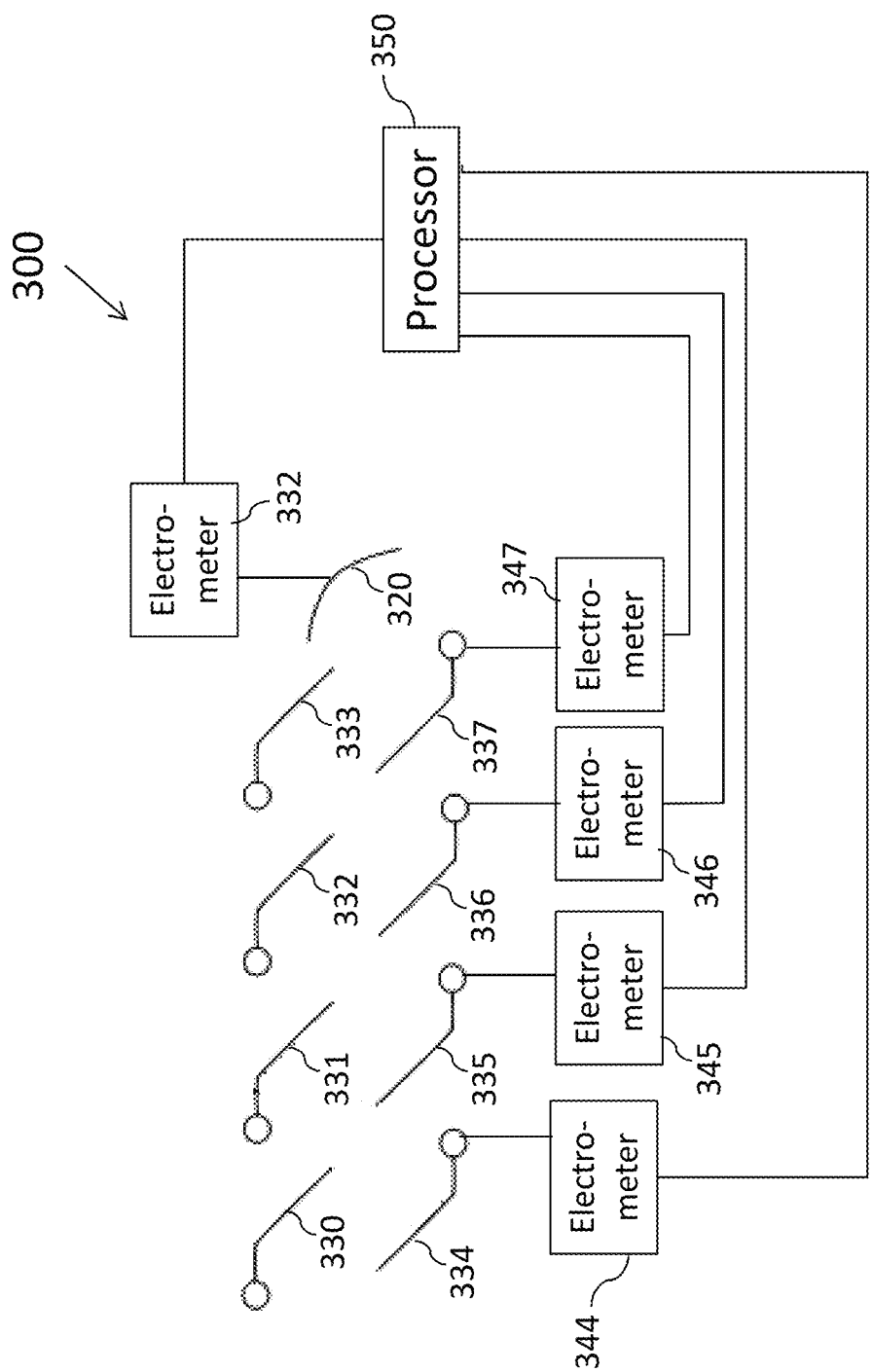
FIG. 3 is an illustration of detector where every other dynode is electrically coupled to an electrometer, in accordance with certain examples; Same as above

In other embodiments and referring now to FIG. 3, it may not be desirable to monitor the current at each dynode of the detector. For example, in an ion detector 300, every other dynode is electrically coupled to an electrometer. The detector 300 comprises a plurality of dynodes stages 330-337 and an optional collector 320, where the collector 320 can be omitted and the last dynode 337 may be the terminal dynode. In the detector 300, every other dynode stage is electrically coupled to a respective electrometer. For example, dynode stages 330-333 are not electrically coupled to an electrometer, and each of dynode stages 334-337 is electrically coupled to a respective electrometer 344-347. The electrometers 344-347 can each be electrically coupled to a first processor 350. If desired, the collector 320 can also be electrically coupled to an optional electrometer 352 and may include a separate electrical coupling to the processor 350. As noted herein, the processor 350 can be present on a printed circuit board, which may include other components commonly found on printed circuit boards including, but not limited to, I/O circuits, data buses, memory units, e.g., RAM, clock generators, support integrated circuits and other electrical components. By configuring the detector with an electrometer on every other electrode, detector fabrication and reduced circuitry can be implemented. As noted in more detail below, selected currents, e.g., selected input currents, from the detector 300 can be used to determine a mean input current, which can be used for calculating an ion concentration, reconstructing an image or for other means. While the configuration shown in FIG. 3 illustrates an electrometer being present at every other dynode, it may be desirable to include an electrometer on adjacent dynodes followed by a dynode stage without an electrometer rather than spacing the electrometers on an every other dynode basis. For example, where a detector comprises eight dynodes and four electrometers, it may be desirable to omit electrometers from all stages except the final four dynode stages 332, 333, 336 and 337. While not shown, the dynodes/electrometer pairs of the detector 300 may be electrically isolated from each other to provide separate signals to the first processor 350.

Figure 4:
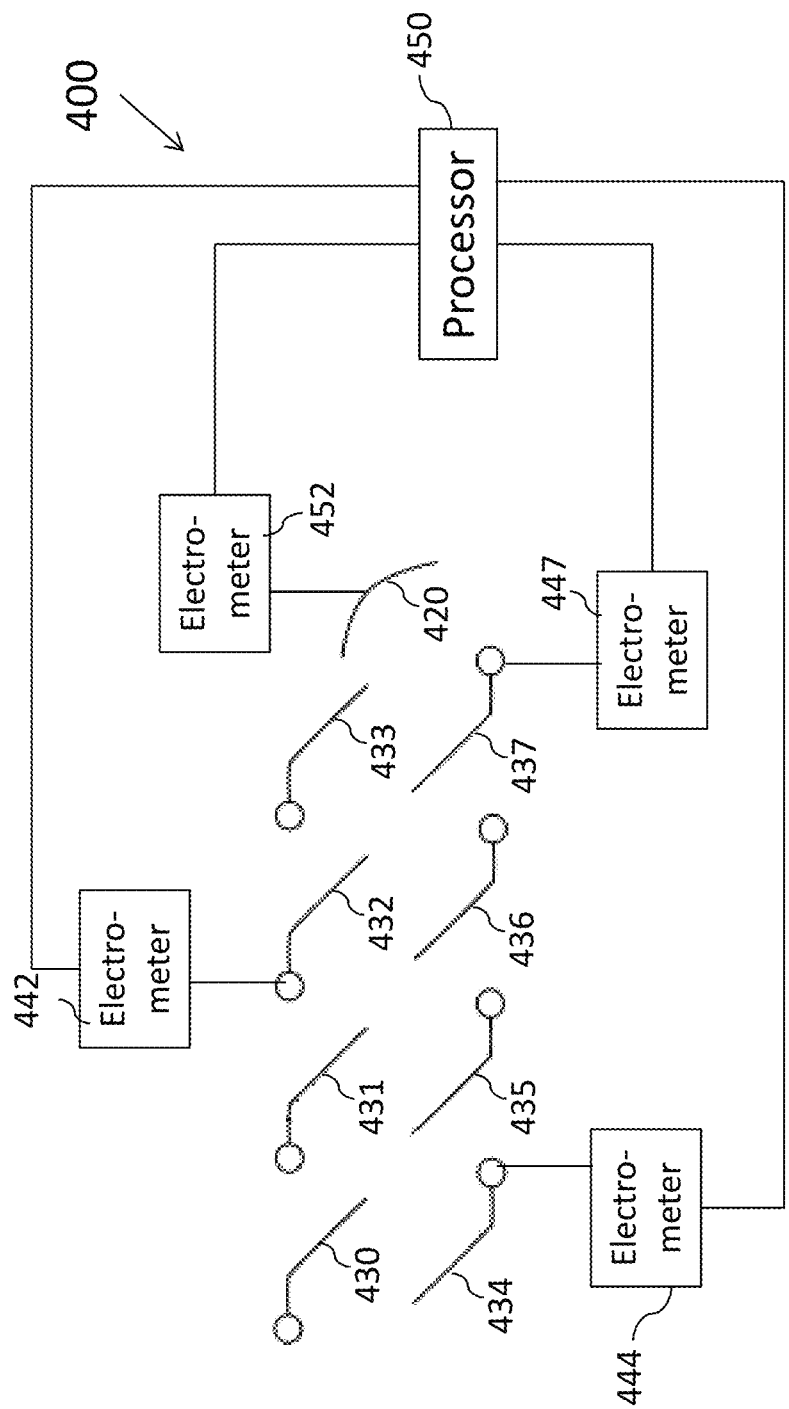
FIG. 4 is an illustration of a detector where every third dynode is electrically coupled to an electrometer, in accordance with certain examples; Same as above

In additional embodiments and referring to FIG. 4, it may be desirable to configure the detector with an electrometer on every third dynode. For example, a detector 400 comprises a plurality of dynodes 430-437 and an optional collector 420, where the collector 420 can be omitted and the last dynode 437 may function as a collector. In the detector 400, every third dynode stage is electrically coupled to a respective electrometer. For example, each of dynode stages 434, 432 and 437 is coupled to an electrometer, 444, 442 and 447, respectively, and all other dynode stages are not coupled to an electrometer. The electrometers 444, 442 and 447 can each be electrically coupled to a first processor 450, e.g., through separate input channels (not shown) of the processor 450. If desired, the collector 420 can also be electrically coupled to an optional electrometer 452. While three electrometers are shown as being present in the detector 400, the three electrometers could, if desired, be positioned together in the middle of the dynode stages, together toward one end of the dynode stages or spaced in some other manner than every third dynode. For example, it may be desirable to omit electrometers from all stages except the final three dynode stages 433, 436 and 437. Additional configurations of a detector comprising three electrometers each electrically coupled to a respective dynode will be readily selected by the person of ordinary skill in the art, given the benefit of this disclosure. While not shown, the dynodes/electrometer pairs of the detector 400 may be electrically isolated from each other to provide separate signals to the first processor 450.

Figure 5:
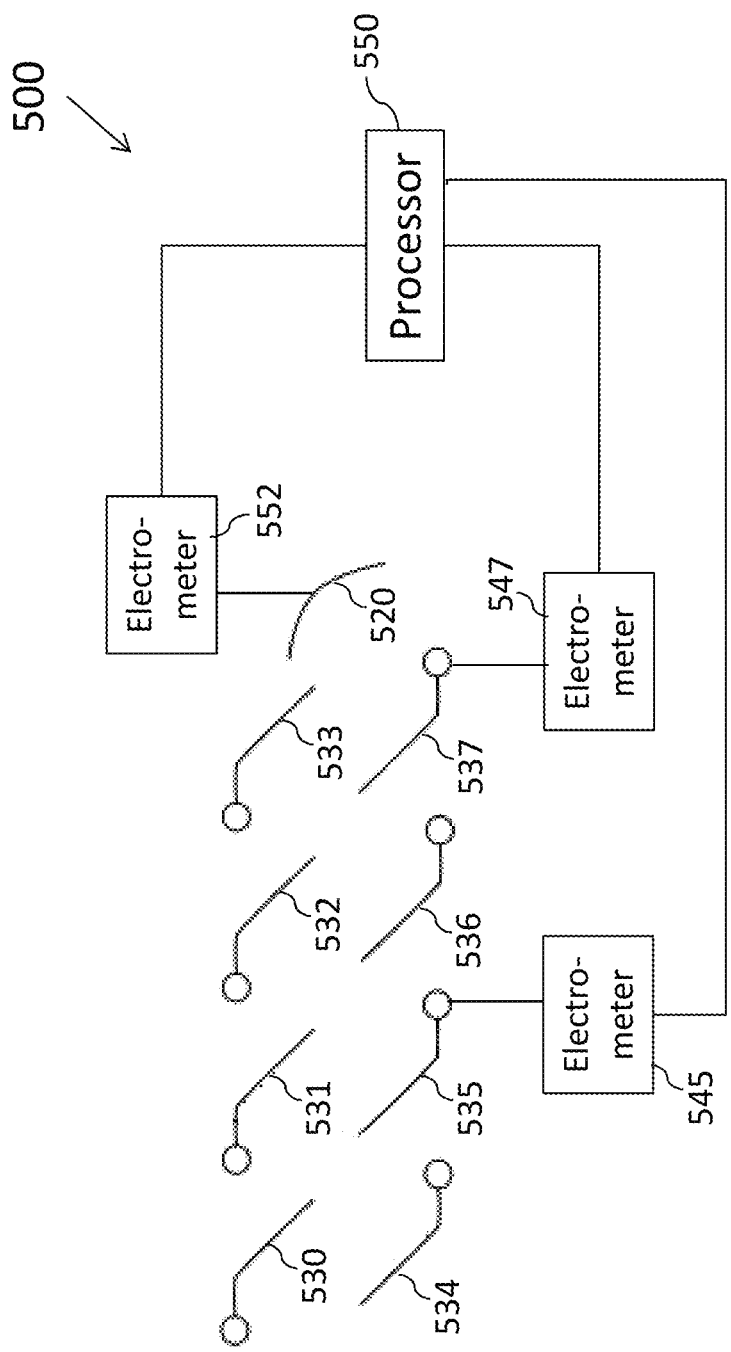
FIG. 5 is an illustration of a detector where every fourth dynode is electrically coupled to an electrometer, in accordance with certain examples; Same as above

In other embodiments and referring to FIG. 5, it may be desirable to configure the detector with an electrometer on every fourth dynode. For example, a detector 500 comprises a plurality of dynodes 530-537 and an optional collector 520, where the collector 520 can be omitted and the last dynode 537 may function as a collector. In the detector 500, every fourth dynode stage is electrically coupled to a respective electrometer. For example, each of dynode stages 535 and 537 is coupled to an electrometer, 545 and 547, respectively, and all other dynode stages are not coupled to an electrometer. The electrometers 545 and 552 can each be electrically coupled to a first processor 550, e.g., through separate input channels (not shown) of the processor 550. If desired, the collector 520 can also be electrically coupled to an optional electrometer 552. While two electrometers are shown as being present in the detector 500, the two electrometers could, if desired, be positioned together in the middle of the dynode stages, together toward one end of the dynode stages or spaced in some other manner than every fourth dynode. For example, it may be desirable to omit electrometers from all stages except the final two dynode stages 533 and 537. Additional configurations of a detector comprising two electrometers each electrically coupled to a respective dynode will be readily selected by the person of ordinary skill in the art, given the benefit of this disclosure. While not shown, the dynodes/electrometer pairs of the detector 500 may be electrically isolated from each other to provide separate signals to the first processor 550.

Figure 6:
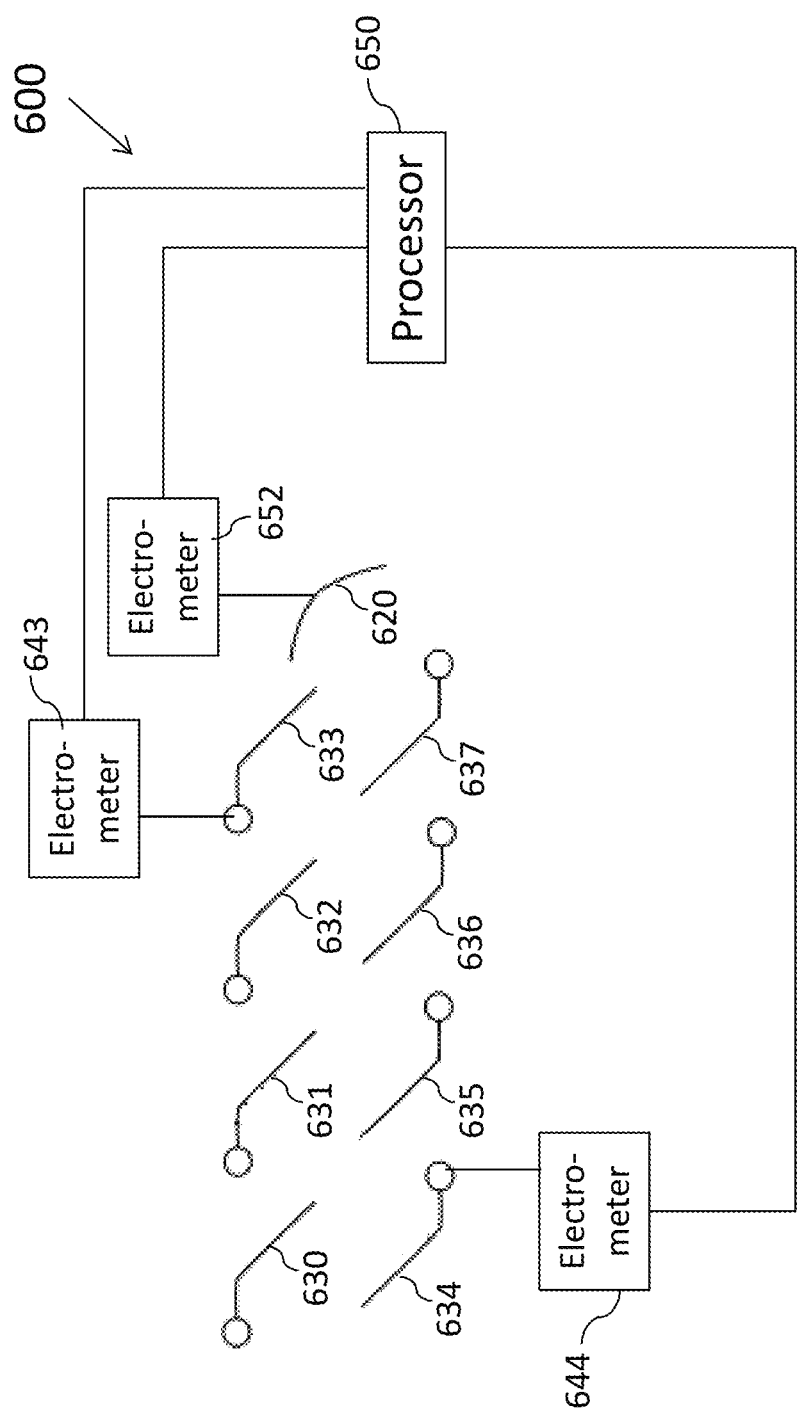
FIG. 6 is an illustration of a detector where every fourth dynode is electrically coupled to an electrometer, in accordance with certain examples; Same as above

In some examples, it may be desirable to configure the detector with an electrometer on every fifth dynode. For example and referring to FIG. 6, a detector 600 comprises a plurality of dynodes 630-637 and an optional collector 620, where the collector 620 can be omitted and the last dynode 637 may function as a collector. In the detector 600, every fifth dynode stage is electrically coupled to a respective electrometer. For example, each of dynode stages 633 and 634 is coupled to an electrometer 643 and 644, respectively, and all other dynode stages are not coupled to an electrometer. The electrometers 643 and 644 can each be electrically coupled to a first processor 650, e.g., through separate input channels (not shown) of the processor 650. If desired, the anode 620 can also be electrically coupled to an optional electrometer 652. While two electrometers are shown as being present in the detector 600, the two electrometers could, if desired, be positioned together in the middle of the dynode stages, together toward one end of the dynode stages or spaced in some other manner than every fifth dynode. In addition, the electrometer coupling need not occur on the second and seventh dynode stages 634 and 633, respectively, but instead may be present on the first dynode 630 and sixth dynode 636, the third dynode 631 and the eighth dynode 637 or other dynodes spaced apart by four dynode stages. While not shown, the dynodes/electrometer pairs of the detector 600 may be electrically isolated from each other to provide separate signals to the first processor 650.

While FIGS. 2-6 show particular electrometer spacing, where more than eight dynode stages are present, the spacing may be different than the particular spacing shown in FIGS. 2-6. For example, the spacing may be greater than every fifth dynode where more than eight dynodes are present, may be concentrated toward the middle dynode stages, may be concentrated toward dynode stages near the anode or may otherwise be spaced in a desired or selected manner. In some instances where a twenty-six dynode electron multiplier is used, a first electrometer may be present at a mid-point, e.g., electrically coupled to dynode 13, and a second electrometer can be positioned upstream of dynode 13 or downstream of dynode 13.

Figure 7:
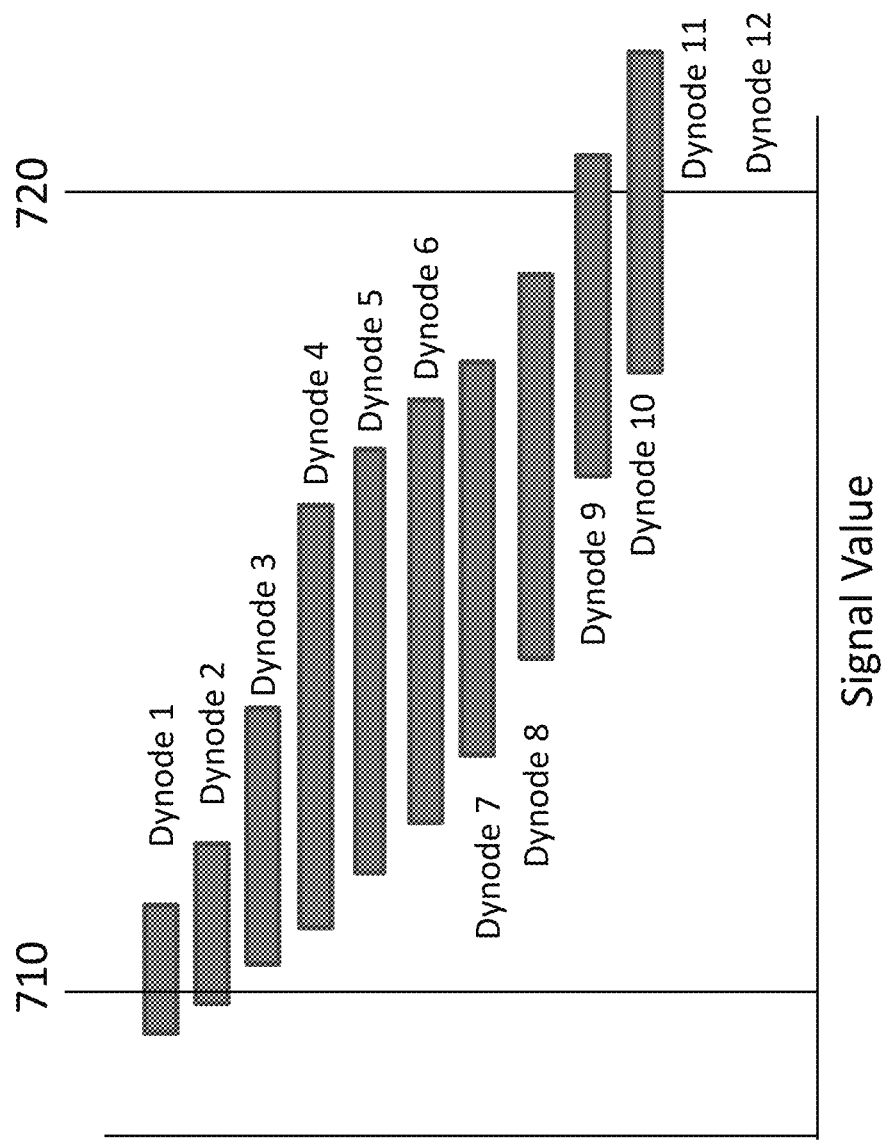
FIG. 7 is a chart showing a signal intensity range for each of a plurality of dynodes, in accordance with certain examples.

In certain embodiments, in operation of the detectors and systems described herein, the signal, e.g., input or output current, can be monitored at the various dynode stages, e.g., this current will be an input current if the next dynode is positively biased or an output current otherwise. This signal can be used to determine a mean ion current signal, which may be used for qualitative purposes, quantitative purposes or used in image construction. Referring to the schematic shown in FIG. 7, illustrative signal values for a detector comprising twelve dynode stages is shown. The bars for each dynode represent the dynamic range of each of the dynodes. For exemplary purposes, dynode 1 is considered to be the dynode immediately adjacent to and downstream of an entry aperture where ions enter into the detector. A lower signal limit 710 can be selected by the processor such that an output signal below the lower limit is considered to be within the noise, e.g., has a signal-to-noise ratio of less than 3. These signals can be discarded. Similarly, an upper signal limit 720 can be selected where values above the upper limit are considered to be saturated dynodes. These values can also be discarded by the processor. Additionally, as described below, where a saturated dynode is detected, dynodes downstream of the saturated dynode can be shorted out, making the saturated dynode function as a collector plate to pull out all electrons to protect the detector. No signals are shown in FIG. 7 for dynodes 11 and 12 as those dynodes are downstream of the saturated dynode (dynode 10). The remaining values within the selected current window (signals for dynodes 3-9) can be used to determine a mean ion signal. For example, if the output current is monitored and the gain of the dynode stages is known, then a mean signal can be determined for the various dynode stages using the current and the gain values. Alternatively, the input current at each dynode can be measured and converted simultaneously. For example, the input current can be computed at each dynode using the gain curve of the dynodes. The input currents (for all input current below saturated dynodes and input currents above dynodes above the signal-to-noise) can simultaneously be averaged, e.g., after normalizing each using the gain, to determine a mean input current that corresponds to the ion signal incident on the ion detector. Additionally, the detector can be configured to shut down dynodes where saturation is observed. For example, if saturation is observed at any dynode stage, then that dynode stage and/or subsequent downstream dynode stages can be shut down, e.g., by altering the voltage at downstream dynodes to stop the cascade, to protect the remaining dynodes of the detector, which will extend detector lifetimes. The averaging of signals and monitoring of individual dynodes can be performed in real time to extend the dynamic range of the detectors, e.g., the dynamic range can be extended by the gain.

Figure 8:
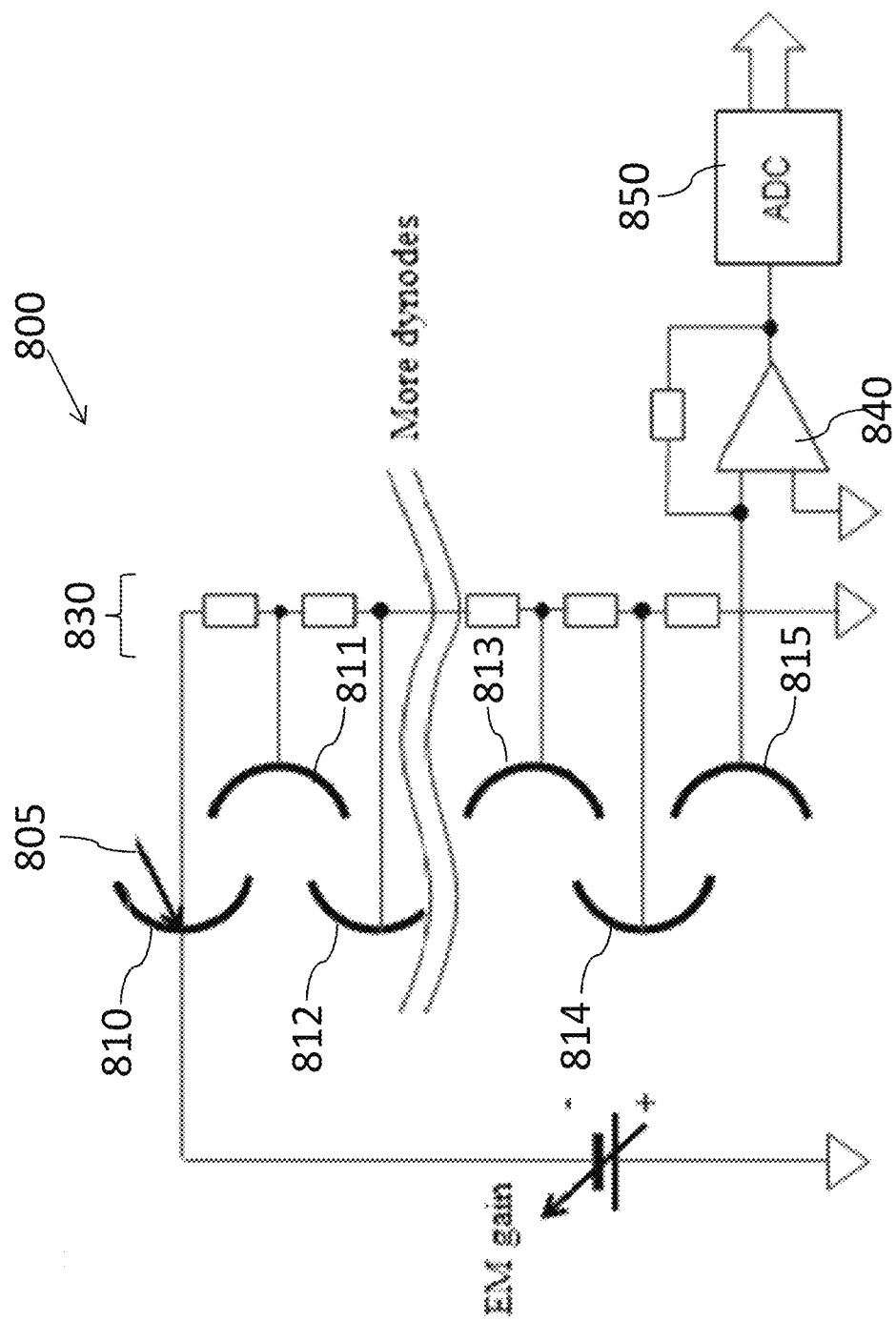
FIG. 8 is an illustration showing the use of a resistor ladder to control the voltage of dynodes in a detector, in accordance with certain examples.

In certain embodiments and referring to FIG. 8, a conventional schematic of certain components of a detector are shown. Six dynodes 810-815 of the detector 800 are shown, though as indicated by the curved lines between dynodes 812 and 813 additional dynode stages can be present. A resistor ladder 830 is used to electrically bias downstream dynodes to have a more positive voltage than upstream dynodes, which results in acceleration of electrons and amplification of the ion signal 805. For example, the voltage of the first dynode 810 is selected such that electrons striking the dynode 810 will be ejected and accelerated toward the second dynode 811. The bias voltage of the various dynodes 810-815 is achieved by selecting suitable resistor values in the resistor ladder 830. For example, the resistor values are selected to supply the difference between the input current minus the output current for each dynode, while substantially maintaining the bias voltage. As shown in FIG. 8, an amplifier 840, e.g., an amplifier with feedback, that is electrically coupled to an analog-to-digital converter 850 can be present to send digital signals to a processor (not shown) for measuring the current at the dynode 815.

Figure 9:
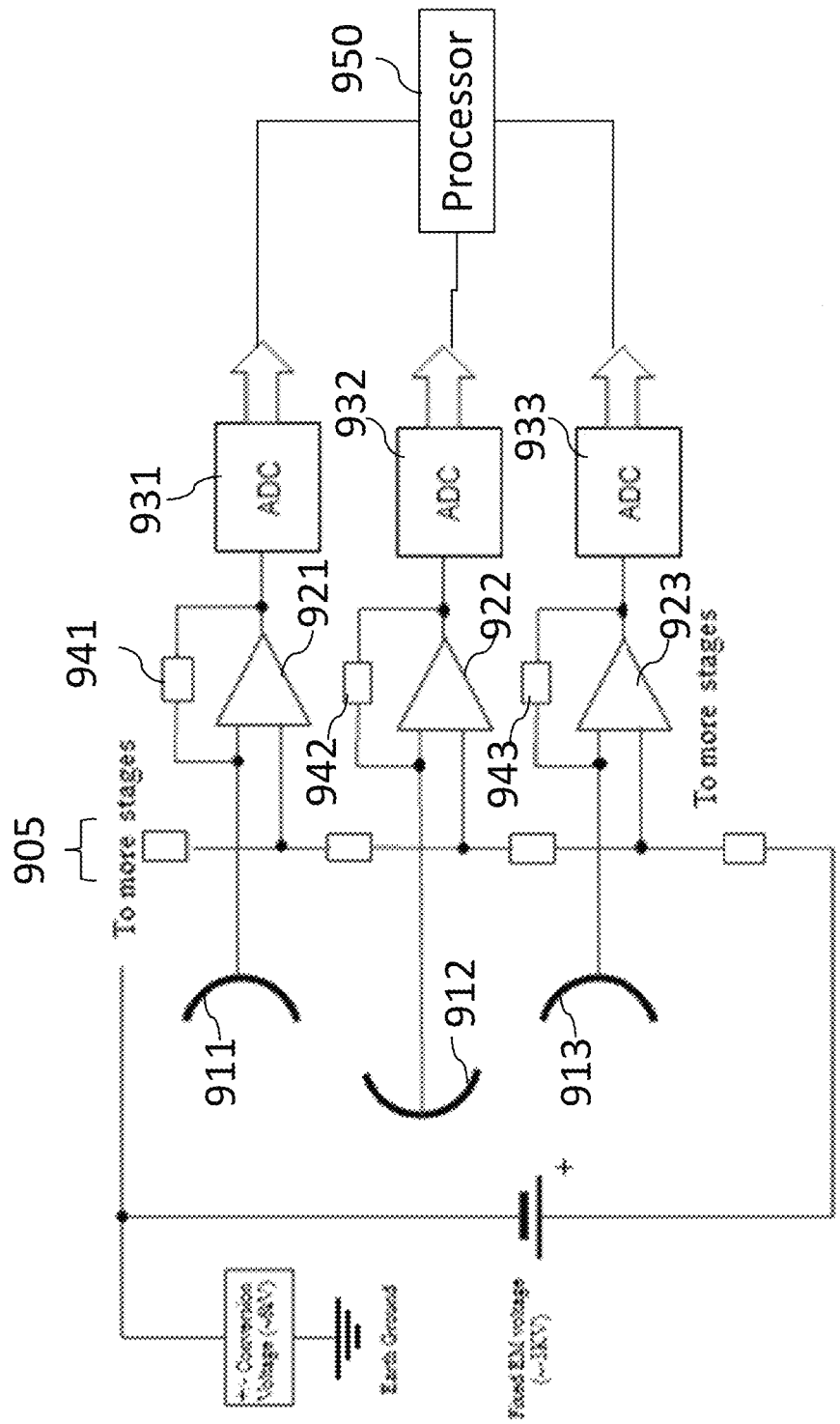
FIG. 9 is an illustration showing the use of a plurality of electrometers each electrically coupled to a respective dynode, in accordance with certain examples; Show insulated connections to processor

In certain configurations of the detectors described herein, the supplied current to each dynode can be a direct measure of the electron current. An electrometer can be used to measure the input current at each dynode without disturbing or altering the other dynode stages. Generally, an amplifier can be coupled to each dynode bias voltage to create a virtual ground at the bias voltage. The output voltage with respect to the virtual ground is proportional to the dynode current multiplied by the resistance of the feedback resistor. Each signal from the amplifier can then be converted, e.g., using an analog-to-digital converter, and the resulting values can be provided to a processor through some means of electrical insulation (or electrical isolation or both) for use in determining a mean input or output current from those signals below a saturation level and above a noise level. One illustration of such a configuration is shown in FIG. 9 where three dynode stages are shown for representative purposes. A dynode 911 is shown as being electrically coupled to an amplifier 921 and a signal converter 931. A resistor 941 is electrically coupled to the amplifier 921. The amplifier 921 is coupled to the dynode bias voltage of dynode 911 to create a virtual ground at the bias voltage. The dynode bias voltage can be provided using resistor ladder 905 as described, for example, in reference to the resistor ladder of FIG. 8. The output voltage with respect to the virtual ground is proportional to the current from the dynode 911 multiplied by the resistance of the feedback resistor 941. The output from the amplifier 921 can then be converted by signal converter 931, and the resulting value can be provided to a processor 950 for use in determining a mean input current if the signal from the dynode 911 is within an acceptable signal window, e.g., is within a window or range between a saturation level signal and a noise level signal. The input current (or output current) at dynode 912 may also be measured in a similar way. In particular, an amplifier 922 is electrically coupled to the dynode 912 and to a signal converter 932. A resistor 942 is electrically coupled to the amplifier 922. The amplifier 922 is coupled to the dynode bias voltage of dynode 912 to create a virtual ground at the bias voltage. The output voltage with respect to the virtual ground is proportional to the current from the dynode 912 multiplied by the resistance of the feedback resistor 942. The output from the amplifier 922 can then be converted by signal converter 932, and the resulting value can be provided to the processor 950. The current may be measured at dynode 913 in a similar way using the amplifier 923, the signal converter 933, the feedback resistor 943 and the processor 950. If desired, separate digital signals can be provided such that measured currents within an acceptable window comprise words or signals that are used by a processor to determine a mean input current, and signals that are not acceptable, e.g., within the noise or representative of saturated signals, are coded differently, e.g., have different words or signals, and are not used by the processor in the calculation.

Figure 10:
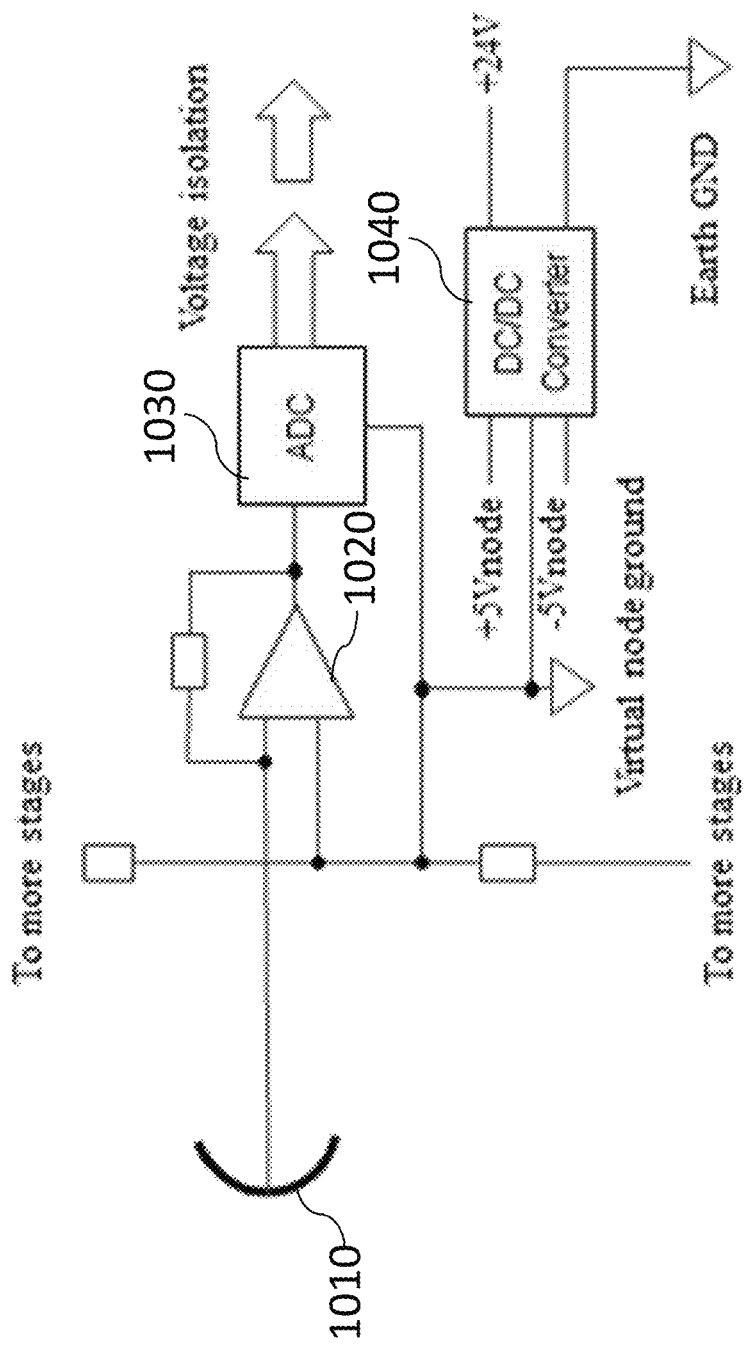
FIG. 10 is an illustration showing a power converter electrically coupled to an amplifier to provide power to the amplifier, in accordance with certain examples.

In certain examples, while all three dynodes in FIG. 9 are shown as including a respective electrometer, it may be desirable to include only two electrometers, e.g., the current at dynode 912 may not be monitored. In some embodiments described herein, the detectors and system can include two, three, four, five or more electrometers coupled to internal dynodes, e.g., those between a first dynode and a collector, to provide sufficient signals in determining mean input signals. If desired, each internal dynode can include a respective electrometer to increase the overall accuracy of the measurements. Referring to FIG. 10, a single dynode 1010 is shown as being electrically coupled to an amplifier 1020. The amplifier 1020 floats at the bias voltage of the dynode 1010. A floating DC/DC converter 1030 can be electrically coupled to the amplifier 1020 and a signal converter 1040 to provide power to these components. The DC/DC converter 1030 typically converts a higher voltage, e.g., 24 Volts, to a lower voltage, e.g., 5 Volts, that is provided to the amplifier 1020 and the signal converter 1040. Power converters other than DC/DC converters may also be used in the configuration shown in FIG. 10 to provide power to the electrometer. If desired, each dynode can be electrically coupled to a power converter. In some embodiments, only those dynodes electrically coupled to an electrometer are also electrically coupled to a power converter. If desired, the first dynode 1010 can be held at a fixed offset, which can assist in keeping the ion to electron conversions constant.

Figure 11:
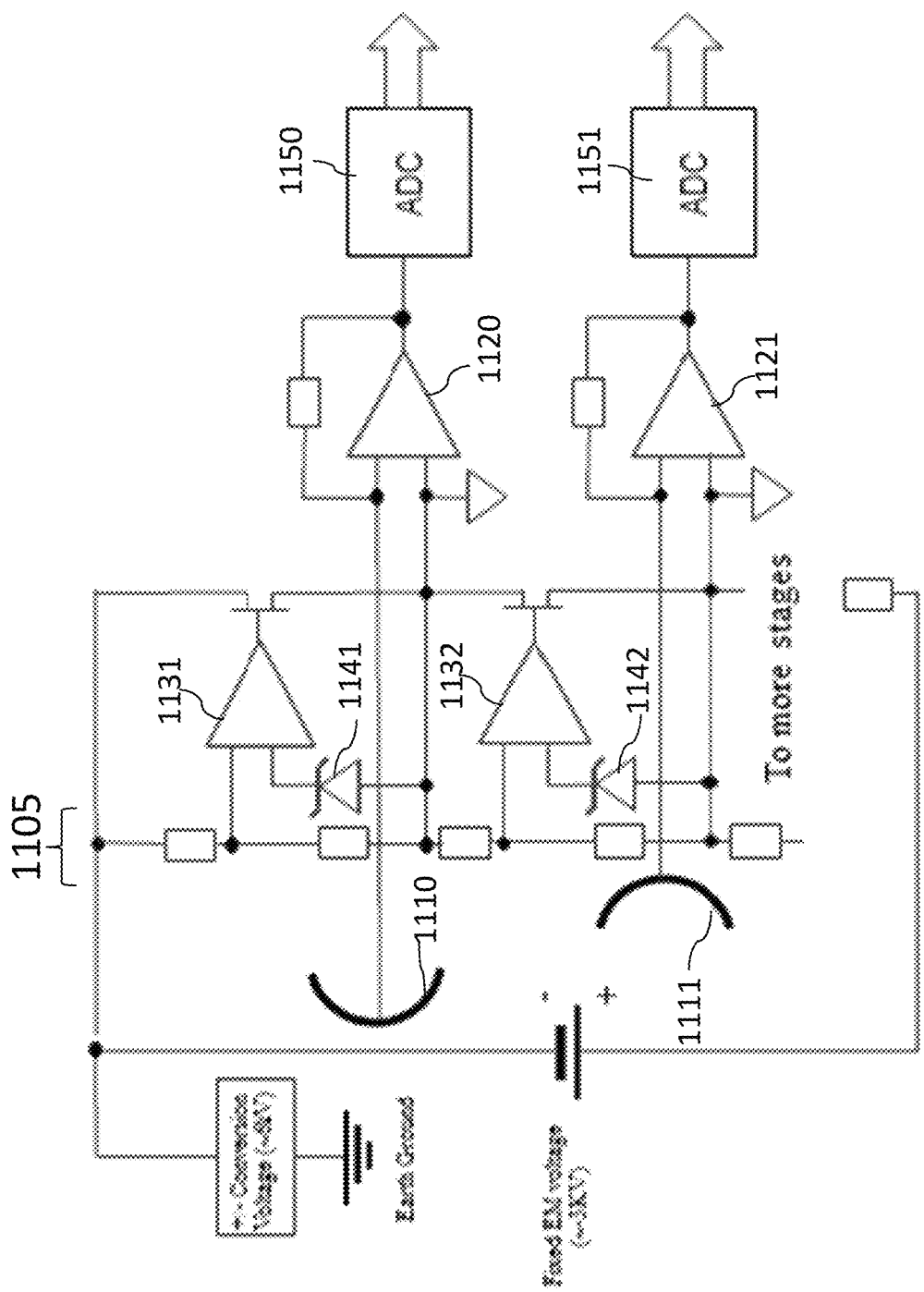
FIG. 11 is an illustration showing an example circuit configured to provide separate control of the dynode bias voltages in a detector, in accordance with certain examples.

In certain examples, the dynode bias voltage, as described herein, can be provided by selecting suitable resistors in the resistor ladder. In this configuration, changing the input ion current will change the dynode to dynode voltage and can introduce errors. To avoid this error, it may be desirable to regulate each dynode voltage to reduce any errors that may be introduced from voltage changes with increased electron currents. One configuration that permits controlling the dynode voltages separately is shown in FIG. 11. To achieve a substantially constant voltage, a Zener diode or a regulated amplifier can be used. The device of FIG. 11 includes dynodes 1110 and 1111 electrically coupled to amplifiers 1120 and 1121, respectively, similar to the configuration described in reference to FIG. 10. An amplifier 1131 can be electrically coupled to the resistor ladder 1105 and to a Zener diode 1141 to provide for independent control of the voltage provided to the dynode 1110. For example, the Zener diode 1141 is electrically coupled to an input of the amplifier 1131 to provide for additional control of the bias voltage for the dynode 1110, e.g., to limit or clip the voltage if desired or needed and generally aid in providing a bias voltage to the dynode 1110 that does not vary substantially as electron currents increase at other dynodes of the detector. Similarly, a Zener diode 1142 is electrically coupled to an input of an amplifier 1132 to permit control of the bias voltage to dynode 1111. An electrometer can be electrically coupled to each of the dynodes 1110 and 1111. For example, an amplifier 1120 can be electrically coupled to the dynode 1110 and used to provide a signal to a signal converter 1150, which may convert the signal, e.g., to a digital signal, and provide the converted signal to a processor (not shown). Similarly, an amplifier 1121 can be electrically coupled to the dynode 1111 and used to provide a signal to a signal converter 1151, which may convert the signal, e.g., to a digital signal, and provide the converted signal to a processor (not shown). Where the detector includes more than two dynodes, there can be multiple voltage controllers, e.g., similar to the amplifier/Zener diode combination shown in FIG. 11, between dynodes to separately control the dynode to dynode voltage of the detector. Each dynode can provide a signal to the processor separate from the signals sent by other dynodes. If desired, there need not be voltage control between each dynode node. For example, it may be desirable to omit voltage control between certain dynodes to simplify the overall construction of the detector. In the configuration shown in FIG. 11, the resistor chain can use very low current, e.g., less than 0.1 mA, which reduces generated heat and current demand on the detector power supply, which is typically a 3 kV power supply.

In certain embodiments, at high levels of incident ions, the downstream dynodes, e.g., those closer to where a collector would typically be found, may begin to saturate. For example, as the input current increases, the downstream dynode stages will start to saturate the amplifiers and the signal converters. While the electronics are not likely to be damaged from saturation, current to these dynodes increases, producing heat in the resistor ladder or voltage regulators. In addition, the materials present on the dynode surfaces that eject electrons can be damaged. Damage or deterioration of the dynode surface can result in a change in the local gain of a particular dynode, which can lead to measurement errors. Desirably, the dynode voltages are selected to overlap well with the dynamic range of each electron detector. It is desirable, for example, to overlap more than 50% to achieve a linear output. Where such a gain is selected for a certain ion level and a subsequent measurement is performed where more ions of a certain mass-to-charge ratio are incident, it may be desirable to stop the electron beam next to a saturated dynode. In some embodiments, the saturated dynode may be the last dynode where the signal is amplified, e.g., the saturated dynode may function as a collector, whereas in other examples, a dynode downstream of the saturated dynode can be shorted out to act like a collector plate to remove all electrons. Many different mechanisms can be used to terminate signal amplification. In one embodiment, the bias voltage of a dynode adjacent to and downstream of a saturated dynode can be adjusted such that electrons are not accelerated from the saturated dynode toward the adjacent downstream dynode, which would cause the saturated dynode to function as a collector plate. In this manner, the electron stream is terminated at the saturated dynode.

Figure 12:
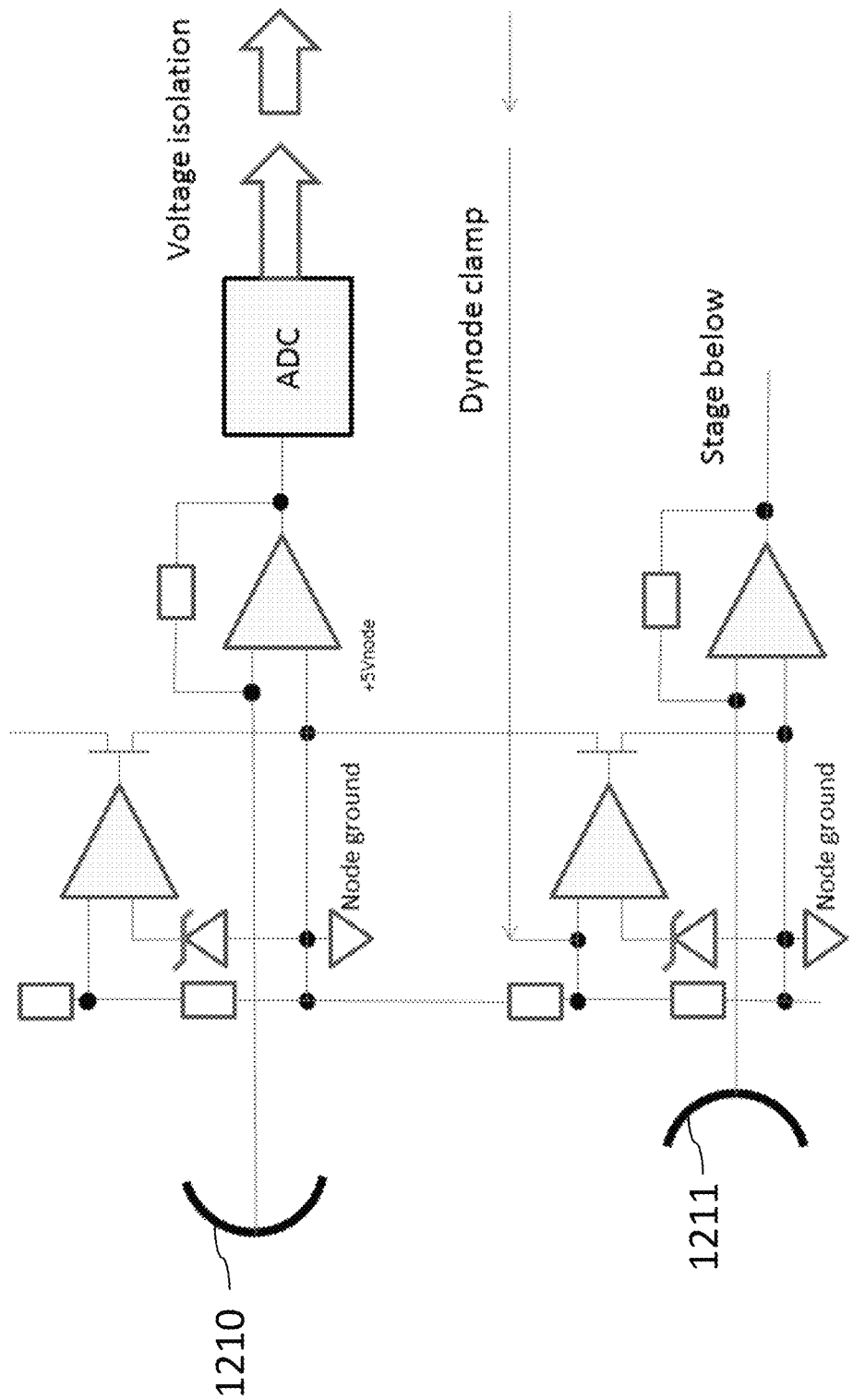
FIG. 12 is a schematic of a circuit configured to terminate amplification of a signal in response to saturation of a dynode, in accordance with certain examples.

Referring to FIG. 12, a schematic is shown of a circuit that can be implemented to terminate signal amplification in the detectors and systems described herein. The components not labeled in FIG. 12 are similar to those described and shown in reference to FIG. 11. At the saturation level, a downstream dynode 1211 (downstream relative to a saturated dynode 1210) can be biased slightly positive in respect to the saturated dynode 1210. For example, the node can shorten the voltage divider on the dynode stage below, to +5V node of the saturation dynode. If a reference voltage of about 2 Volts is present, the dynode 1211 below will end up about +3V over the saturated dynode. The output signal of the saturated dynode will become a collector and will collect all electron currents. The ADC will saturate in the reverse polarity. If desired, this configuration can be used to clamp the dynode gain voltage directly, or can be detected by the control system. For example, as the incident signal changes, the particular dynode where signal termination occurs may change from measurement to measurement. Desirably, the protection switching speed can be close to the ADC conversion speed, so signal termination can be implemented before any damage to downstream dynodes can occur.

It is a substantial attribute of embodiments described herein that by stopping the signal amplification at a saturated dynode (or a dynode downstream from a saturated dynode), the gain of the device can be fixed and not user adjustable. For example, in a detector operated at a fixed gain and with 26 dynodes, if saturation is detected at dynode 23, then amplification may be terminated by shorting out the amplification at dynode 23. For a subsequent measurement or receipt of ions with a same or different mass-to-charge ratio at the same fixed gain, the number of ions may be such that saturation occurs at dynode 19. Amplification can be terminated at dynode 19 without having to adjust the gain, as would be required when using a typical electron multiplier. In this manner, a single fixed gain can be selected, and the detector can monitor the input currents of the dynodes to determine when signal amplification should terminate. One result of such configurations is extending the dynamic range of the detector without loss of linearity or detection speed. For example, if the current at each dynode is measured, then the dynamic range is extended by the gain. If a 16-bit analog-to-digital converter is used, then this is 65 k ($2^{16}$) times the gain. Where the system is designed to terminate amplification at a saturated dynode, the detector can be operated at a maximum voltage, e.g., 3 kV, to provide a maximum gain. At this voltage, a gain of $10^7$ would be anticipated in many detectors. To account for noise and assuming a signal-to-noise of 10:1 for a single ion event, the dynamic range would be reduced by a factor of 10. The total dynamic range when using a 16-bit ADC on every dynode would be expected to be about $6 \times 10^{10}$ (65,000 times $10^6$). If conversion of the readings occurs at a frequency of 100 kHz, then about 100,000 different sample measurements can be averaged to expand the dynamic range to a total dynamic range of about $6 \times 10^{15}$. For a particular sample, different mass-to-charge ions varying greatly in intensities can be scanned and detected without having to alter the gain of the detector.

Figure 13:
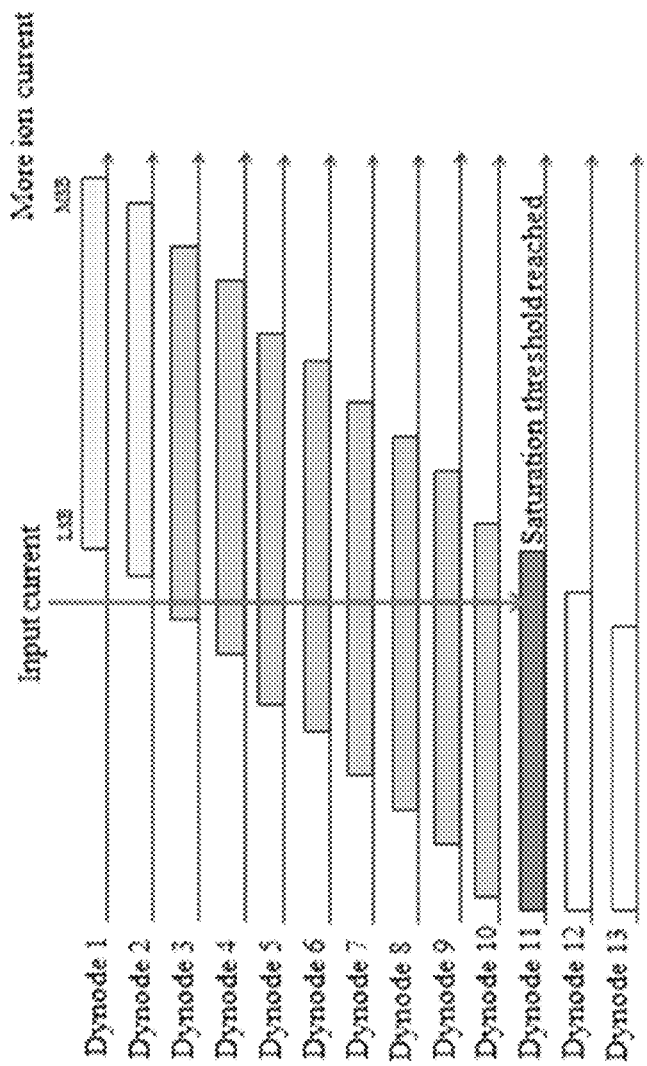
FIG. 13 is a chart illustration showing the dynamic range of various dynodes, in accordance with certain examples.

In certain embodiments to demonstrate a typical output of dynodes, and accounting for the dynamic range at each dynode, an illustration is shown in FIG. 13 of the dynode current for each dynode in a 13 dynode detector relative to an input current. As shown in FIG. 13, the output of the ADC's for Dynodes 1 and 2 is very low and within the electronic noise. As such, these outputs are discarded and not considered in the input calculations. Dynodes 3 to 10 provide ADC outputs within an acceptable window. The signal values of dynodes 3-10 can be averaged to provide a seven-fold accuracy improvement over a single ADC reading. Dynode 11 is measured as being saturated, which results in switching off of dynodes 12 and 13 thus terminating the amplification at dynode 11. The measurement from dynodes 11-13 can also be discarded or otherwise not used in averaging to provide a mean input current that corresponds to an incident ion signal.

In certain examples and as described herein, measurement of a current at every dynode is not required. Instead, every second, third or fourth dynode could be measured and used. The gain between each stage can be any value, and can be 'calibrated' by comparing its ADC reading to the stage below and above. This found gain can then be used as input current equals the sum of all stage gains time ADC readings. In some instances, the fixed voltage can be larger than the sum of all dynode stage voltages, and the bottom or last resistor can be used to absorb any extra voltage. In addition, the bottom resistor can also absorb any excess voltage generated by shorting a dynode for termination of signal amplification. In some configurations, it may be desirable to have enough dynodes to compensate for eventual aging. For example, if EM gain decreases over time due to deterioration of surface materials, the saturation point may move further downstream in the dynode set. If the last dynode does not produce a signal-to-noise of 10 to 1 (or other selected signal-to-noise) for a single ion event, that response may be indicative that the detector has exceeded its useful life. The expected detector lifetime should be much larger than the current conventional system due to signal termination at a saturated dynode and protection of downstream dynodes.

Figure 14A:
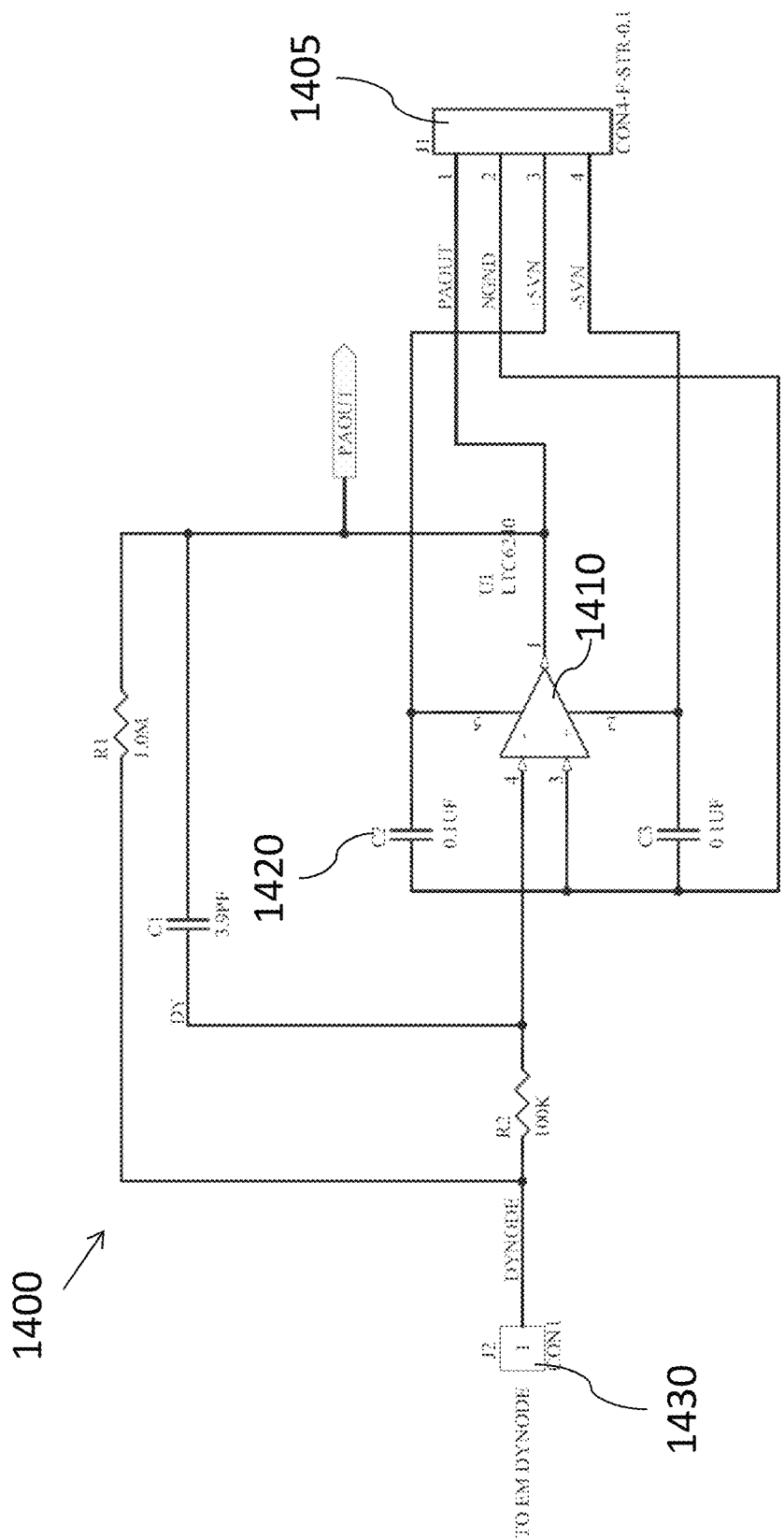
FIG. 14A is a circuit configured to control dynode voltage, in accordance with certain examples.

In certain embodiments, another schematic of a circuit that can be used to measure the signal from a dynode is shown in FIG. 14A. The circuit 1400 generally comprises an amplifier 1410 electrically coupled to a capacitor 1420 and a controller 1405 (or processor if desired). The circuit is electrically coupled to a dynode (not shown) through component 1430. Digital signals can be provided from a processor and used to control the bias voltage of the dynodes. For example, signals from the processor can be used to short out the dynode, to regulate the dynode bias voltage or to otherwise assist in the signal amplification mechanism or terminate the signal amplification mechanism.

Figure 14B:
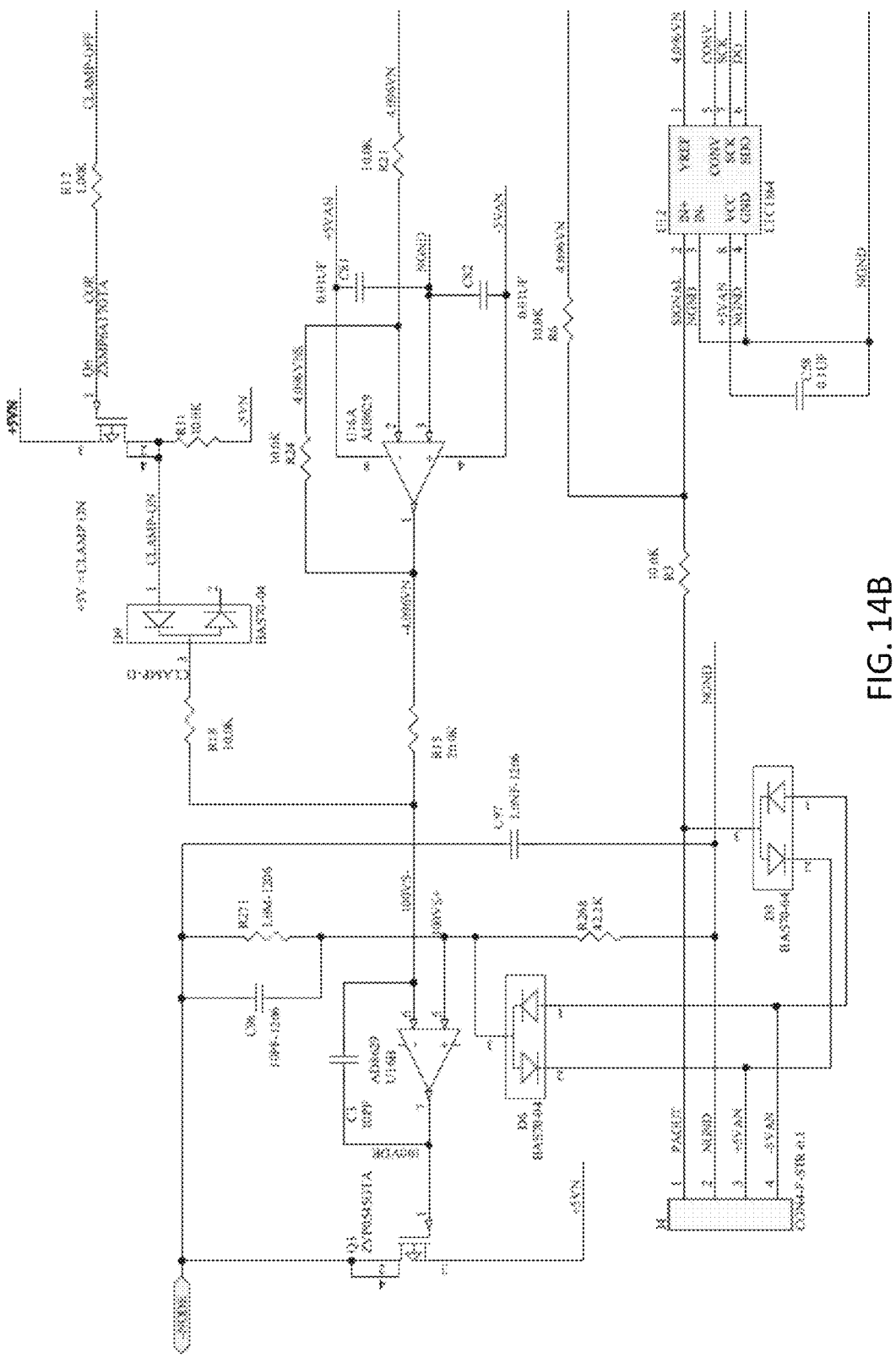
FIGS. 14B and 14C together show a schematic of another circuit configured to control dynode voltage, in accordance with certain configurations.
Figure 14C:
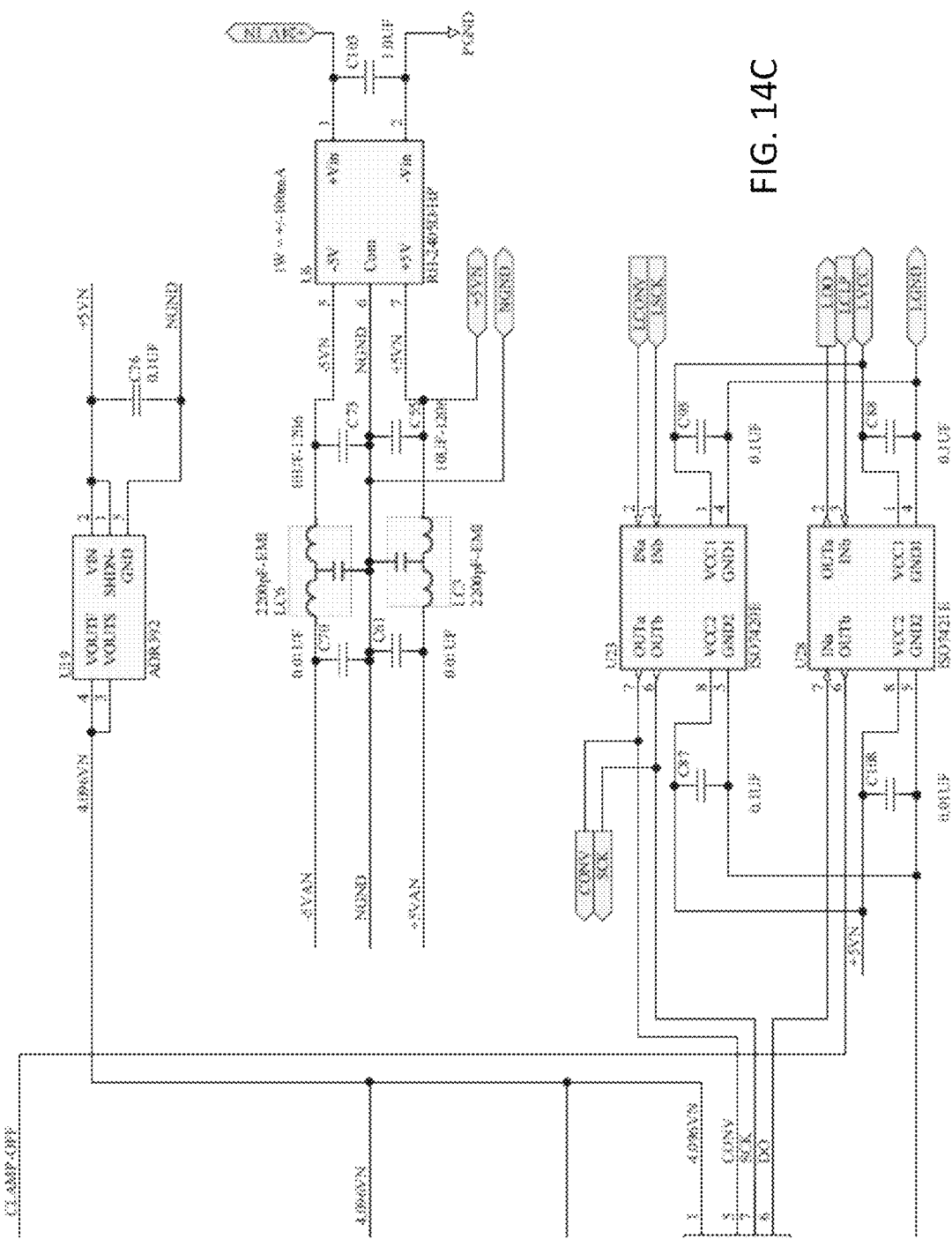

In certain configurations, another schematic of a circuit is shown in FIGS. 14B and 14C. The circuit has been split into two figures to provide for a more user friendly version of the circuit. In the schematic NGND represent a virtual ground. The circuit comprises a DC/DC converter U6 electrically coupled to amplifiers U16A and U16B to provide a voltage to the dynode (labeled as node) of about 101 Volts. A reference voltage of about 4.096 volts is provided from a voltage reference U19 and can be used with the voltage from the DC/DC converter U6, e.g., using the outputs of amplifiers U16A and U16B and amplifier Q3, to provide the 101 Volts to the dynode. Analog signals from the dynode can be measured by an electrometer J4 and provided to an analog-to-digital converter U12. The analog-to-digital converter U12 is electrically coupled to digital isolators U23 and U24, which can isolate the signals from the dynode. The outputted signals from each dynode can be electrically insulated from the signals of other dynodes so that each signal from each dynode is separate from signals from other dynodes, which permits simultaneous measurement of signals from different dynodes. To determine if a saturation signal is present at any one dynode, saturation threshold values can be set in software, and where saturation is detected at the dynode, the voltage can be clamped to stop amplification at the saturated dynode. For example, drive amplifier Q6 and other components of the clamp can be used to short out the dynode, e.g., to place it at virtual ground NGND, which will stop signal amplification at that dynode. Each dynode of the dynode set may comprise a circuit similar to that shown in FIGS. 14B and 14C to provide for independent voltage control, independent voltage clamping (if desired) and to provide separate, electrically isolated signals from each non-shorted dynode to a processor or other input device. In use of the circuit of FIGS. 14B and 14C, dynode signals from dynodes of a dynode set can be measured or monitored. Where a non-saturated signal is detected, amplification may continue using downstream dynodes, e.g., by providing a suitable voltage to the downstream dynodes. When a saturation signal is detected, the dynode where the saturation signal is observed can be grounded to the virtual ground to terminate the amplification at that saturated dynode. Signals from dynodes downstream of the clamped, saturated dynode generally represent noise signals as no amplification occurs at these downstream dynodes. Signals upstream of the saturated dynode and signals above a noise threshold value can be used, e.g., averaged, to determine a mean input current (or mean output current).

In certain embodiments, in implementing the detectors described herein, commercially available components can be selected and assembled as part of larger circuitry on a printed circuit board and/or as a separate board or chip that can be electrically coupled to the dynodes. Certain components can be included within the vacuum of the detectors, whereas other components may remain outside the vacuum tube of the detector. For example, the electrometers, over-current protections and voltage dividers can be placed into the vacuum tube as they do not produce any substantial heat that may increase dark current. To provide an electrical coupling between the components in the vacuum tube and the processor of the system, suitable couplers and cabling, e.g., a flex PCB feed cable that can plug into a suitable coupler, can be implemented.

Figure 15:
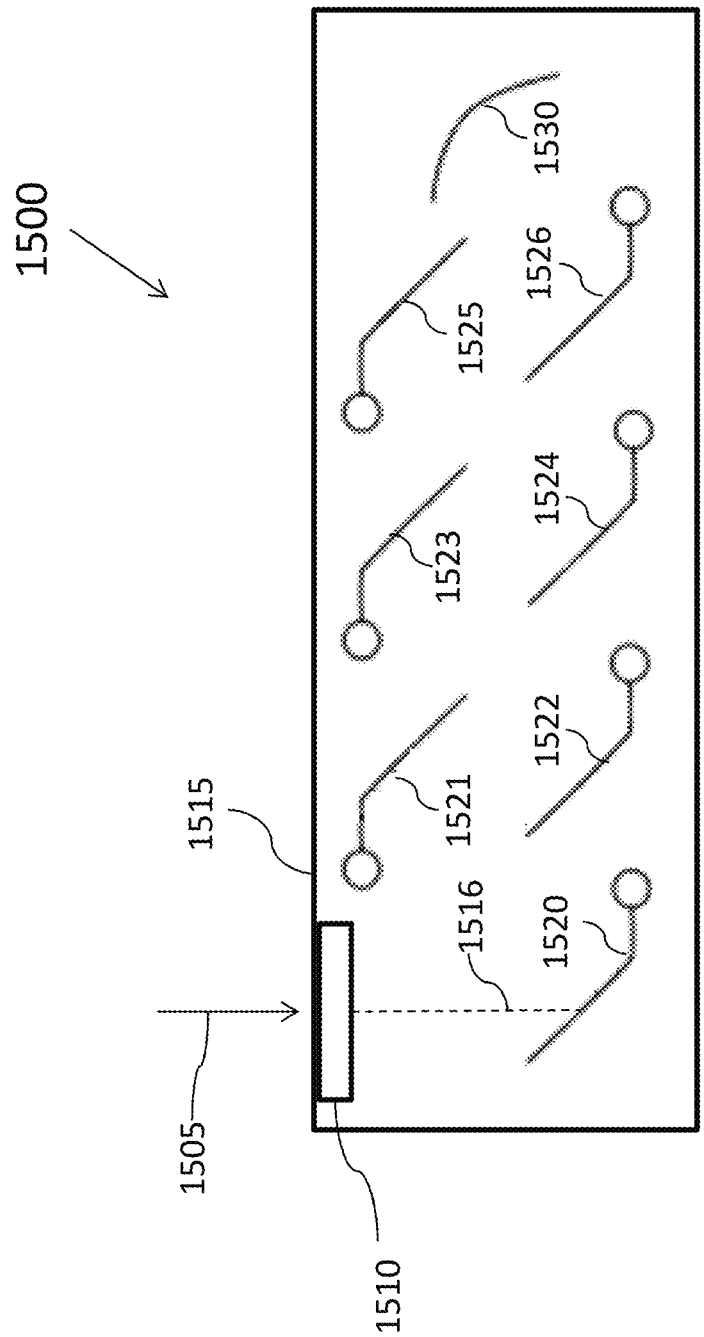
FIG. 15 is an illustration of a side-on detector in accordance with certain examples.

In certain embodiments, the detectors described herein can be configured as either side-on or end-on (also referred to as head-on) devices. Examples of end-on devices are pictorially shown in FIGS. 1-4, for example, where the light is incident on an end of the detector. The housing of an end-on detector would typically be opaque such that the end of the detector near the photocathode is the only portion that receives any substantial light. In other configurations, a side-on detector can be implemented in a similar manner as described herein, e.g., a side-on detector can include a plurality of continuous dynodes with one, two, three or more (or all) of the dynodes electrically coupled to a respective electrometer. One illustration of a side-on detector is shown in FIG. 15. The detector 1500 comprises an aperture 1510, which is positioned on the side 1515 of the device 1500. Ions (shown as beam 1505 outside the detector and beam 1516 inside the detector) can enter the aperture 1510 on the side 1515 of the detector 1500 and strike a dynode 1520. As described in reference to the end-on device, the dynode 1520 can emit electrons which are amplified by dynodes 1521-1526 within the device 1500 and collected by the collector 1530. Selected dynodes of the side-on detector 1500 can be electrically coupled to a respective electrometer and may include suitable circuitry, e.g., similar to that described in connection with FIGS. 1-12, to permit measurement of input current at the dynodes 1520-1526 and calculation of a mean input current signal, if desired. While an incident ion is shown in FIG. 15 as being incident at about a ninety degree angle relative to the aperture 1510, angles other than ninety degrees can also be used. If desired, one or more ion lens elements can be used to provide the ions at a selected trajectory to the detector 1500.

In certain examples, the exact dynode configuration present in any detector can vary. For example, the dynode arrangement may be of the mesh type, Venetian blind type, linear-focused type, box-and-grind type, circular-cage type, microchannel plate type, metal channel dynode type, electron bombardment type or other suitable configurations. In certain embodiments, the detectors described herein can be produced using suitable materials for the dynode and the collector. For example, the dynodes can include one or more of the following elements or materials: Ag—O—Cs, GaAs:Cs, GaAs:P, InGaAs:Cs, Sb—Cs, Sb—K—Cs, Sb—Rb—Cs, Na—K—Sb—Cs, Cs—Te, Cs—I, InP/InGaAsP, InP/InGaAs, or combinations thereof. The dynodes of the detectors may include one or more of carbon (diamond), AgMg, CuBe, NiAl, $Al_2O_3$, BeO, MgO, SbKCs, $Cs_3Sb$, GaP:Cs or other suitable materials. As noted herein, the exact material selected for use in the dynodes has a direct effect on the gain, and gain curves for a known material can be used in the calculations described herein if desired. One or more of these materials can be present on a surface at a suitable angle to permit the surface to function as a dynode. The collector may also include suitable materials to permit collection of any electrons, e.g., one or more conductive materials.

In certain examples, the detectors described herein can be used in many different applications including, but not limited to, medical and chemical instrumentation, ion and particle detectors, radiation detectors, microchannel plate detectors and in other systems where it may be desirable to detect ions or particles. Illustrations of these and other detectors are described in more detail below.

Figure 16:
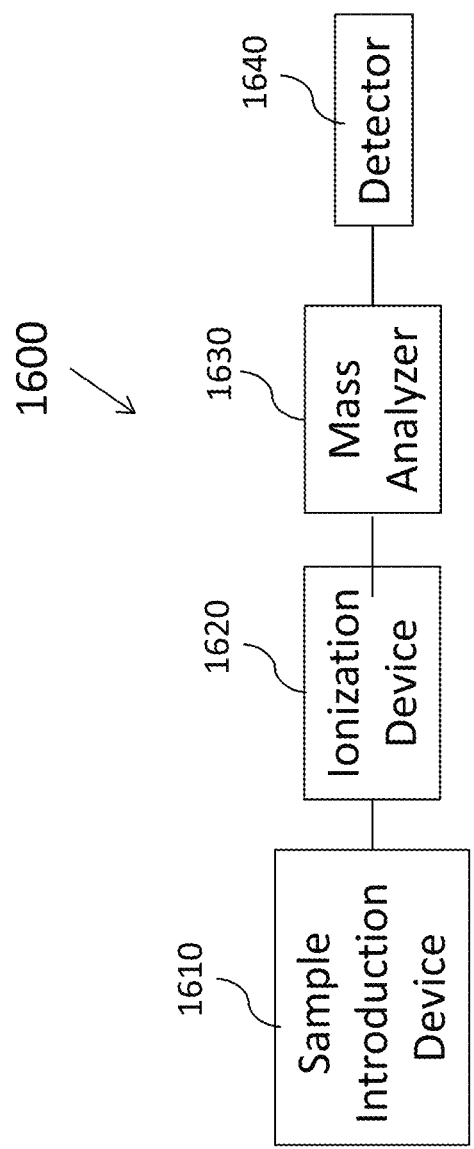
FIG. 16 is a block diagram of a mass spectrometer, in accordance with certain examples.

In certain embodiments, the detectors and associated circuitry described herein can be used in medical and chemical instrumentation. For example, the detectors can be used in mass spectrometry applications to detect ions that result from fragmentation or ionization of a sample to be analyzed. A general schematic of a mass spectrometer 1600 is shown in FIG. 16. The mass spectrometer 1600 comprises four general components or systems including a sample introduction device 1610, an ionization device 1620 (also referred to as an ion source), a mass analyzer 1630 and a detector 1640. Each of these components is discussed in more detail herein, but generally the detector 1640 may be any one of more of the detectors described herein, e.g., a detector comprising dynodes electrically coupled to electrometers. As noted herein, the detector can measured the charge induced or the current produced when an ion is incident on the detector. The sample introduction device 1610, the ionization device 1620, the mass analyzer 1630 and the detector 1640 may be operated at reduced pressures using one or more vacuum pumps. In certain examples, however, only the mass analyzer 1630 and the detector 1640 may be operated at reduced pressures. The sample introduction device 1610 may take the form of a sample inlet system that can receive sample while permitting the components to remain under vacuum. The sample introduction device 1610 can be configured as batch inlet, a direct probe inlet, a chromatographic inlet or other sample introduction systems such as those used, for example, in direct sample analysis. In batch inlet systems, the sample is externally volatized and "leaks" into the ionization region. In direct probe inlet systems, the sample is introduced into the ionization region using a sample holder or probe. In chromatographic inlet systems, the sample is first separated using one or more chromatographic techniques, e.g., gas chromatography, liquid chromatography or other chromatographic techniques and the separated components then be introduced into the ion source 1620. In some embodiments, sample introduction device 1610 may be an injector, a nebulizer or other suitable devices that may deliver solid, liquid or gaseous samples to the ionization device 1620. The ionization device 1620 may be any one or more of the devices which can atomize and/or ionize a sample including, for example, plasma (inductively coupled plasmas, capacitively coupled plasmas, microwave-induced plasmas, etc.), arcs, sparks, drift ion devices, devices that can ionize a sample using gas-phase ionization (electron ionization, chemical ionization, desorption chemical ionization, negative-ion chemical ionization), field desorption devices, field ionization devices, fast atom bombardment devices, secondary ion mass spectrometry devices, electrospray ionization devices, probe electrospray ionization devices, sonic spray ionization devices, atmospheric pressure chemical ionization devices, atmospheric pressure photoionization devices, atmospheric pressure laser ionization devices, matrix assisted laser desorption ionization devices, aerosol laser desorption ionization devices, surface-enhanced laser desorption ionization devices, glow discharges, resonant ionization, thermal ionization, thermospray ionization, radioactive ionization, ion-attachment ionization, liquid metal ion devices, laser ablation electrospray ionization, or combinations of any two or more of these illustrative ionization devices. The mass analyzer 1630 may take numerous forms depending generally on the sample nature, desired resolution, etc. and exemplary mass analyzers are discussed further below. The detector 1640 may be any suitable detector described herein, e.g., electron multipliers, scintillation detectors, etc. any of which may comprise dynodes electrically coupled to electrometers. The system 1600 is typically electrically coupled to a processor (not shown) which includes a microprocessor and/or computer and suitable software for analysis of samples introduced into MS device 1600. One or more databases may be accessed by the processor for determination of the chemical identity of species introduced into MS device 1600. Other suitable additional devices known in the art may also be used with the MS device 1600 including, but not limited to, autosamplers, such as AS-90plus and AS-93plus autosamplers commercially available from PerkinElmer Health Sciences, Inc.

In certain embodiments, the mass analyzer 1630 of system 1600 may take numerous forms depending on the desired resolution and the nature of the introduced sample. In certain examples, the mass analyzer is a scanning mass analyzer, a magnetic sector analyzer (e.g., for use in single and doublefocusing MS devices), a quadrupole mass analyzer, an ion trap analyzer (e.g., cyclotrons, quadrupole ions traps, orbitraps), time-of-flight analyzers (e.g., matrix-assisted laser desorbed ionization time of flight analyzers), and other suitable mass analyzers that may separate species with different mass-to-charge ratios. In some embodiments, the mass analyzer may be coupled to another mass analyzer which may be the same or may be different. For example, a triple quadrupole device can be used as a mass analyzer. If desired, the mass analyzer 1630 may also include ions traps or other components that can assist in selecting ions with a desired mass-to-charge ratio from other ions present in the sample. The mass analyzer 1630 can be scanned such that ions with different mass-to-charge ratios are provide to the detector 1640 in real time.

In certain embodiments, the detector 1640 selected for use may depend, at least in part, on the ionization technique and/or the mass analyzer selected. For example, it may be desirable to use an electron multiplier comprising dynodes coupled to electrometers with high dynamic range time of flight analyzers and for instruments including quadrupole analyzers. In general, the detector 1640 may be any of the detectors described herein including those with a plurality of dynodes, those with multichannel plates and other types of detectors that can amplify an ion signal and detect it as described herein. For example, the detector can be configured as described in reference to FIGS. 1-12. In other embodiments, certain components of the detectors described herein can be used in a microchannel plate to amplify a signal. The microchannel plate functions similar to the dynode stages of the detectors described herein except the many separate channels which are present provide spatial resolution in addition to amplification. The exact configuration of the microchannel plate can vary, and in some examples, the microchannel plate (MCP) can take the form of a Chevron MCP, a Z-stack MCP or other suitable MCPs. Illustrative MCPs are described in more detail below. Notwithstanding the type of detector used, the detector can receive ions as the instrument scans different mass-to-charge ratios. A mass spectrum can be produced which is a function of the number of ions having a selected mass-to-charge ratio for each of the mass-to-charge ratios scanned. If desired, the number of ions arriving per second at a particular mass-to-charge may be calculated. Depending on the level of the ions in a sample, the detector can dynamically determine whether saturation at any particular dynode is present and use selected dynode input current to determine a mean input current for each ion. The mean input current may be used to generate a mass spectrum that may be more precise than mass spectra generated using existing methods and techniques.

Figure 17B:
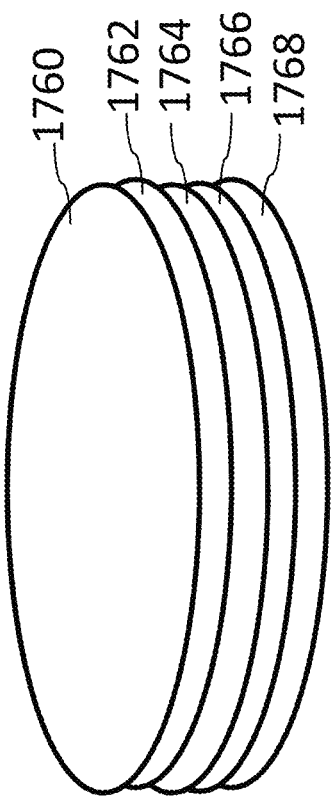
FIG. 17B is an illustration of stacked microchannel plates each of which can function as a dynode, in accordance with certain configurations.
Figure 17A:
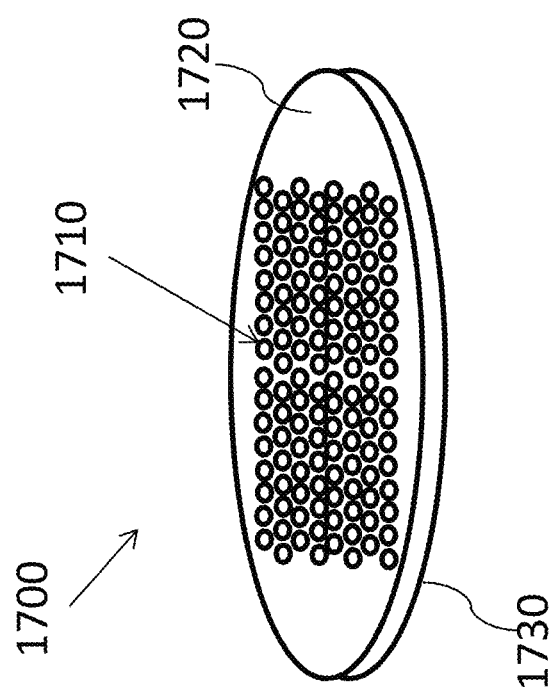
FIG. 17A is an illustration of a microchannel plate, in accordance with certain examples.

In certain embodiments and referring to FIG. 17A, a schematic of a microchannel plate 1700 is shown comprising a plurality of electron multiplier channels 1710 oriented substantially parallel to each other. The exact number of channels in the plate 1700 can vary, e.g., 100-200 or more. The MCP can include electrodes 1720 and 1730 on each surface of the plate to provide a bias voltage from one side to the other to side of the plate. The walls of each of the channels 1710 can include a material which can emit secondary electrons that can be amplified down the channel. Each channel (or a selected number of channels) can be electrically coupled to a respective electrometer to measure the input current from each channel. For example, non-saturated channels can be used to calculate input currents and saturated channels can be shorted out to protect the channel or otherwise not used to provide a signal or an image. If desired, the electrodes 1720 and 1730 can be configured as an electrode array with an electrode corresponding to each channel to permit independent control of the voltage provided to each channel. In addition, in some configurations each channel can be electrically isolated from other channels to provide a plurality of continuous but separate dynodes in the plate 1700. An external voltage divider can be used to apply a bias voltage to accelerate electrons from one side of the device to the other. In certain embodiments, the MCP's can be configured as a chevron (v-like shape) MCP. In one configuration, a chevron MCP includes two microchannel plates where the channels are rotated about ninety degrees from each other. Each channel of the chevron MCP can be electrically coupled to a respective electrometer or a selected number of channels can be electrically coupled to an electrometer. In other embodiments, the MCP can be configured as a Z stack MCP, with three microchannel plates aligned in a shape that resembles a Z. The Z stack MCP may have increased gain compared to a single MCP.

In some instances, a plurality of microchannel plates may be stacked and configured such that each plate functions similar to a dynode. One illustration is shown in FIG. 17B where plates 1760, 1762, 1764, 1766 and 1768 are stacked together. While not shown, one, two, three, four or all five of the plates may be electrically coupled to a respective electrometer. The voltages applied to each plate may be controlled using circuits and configurations similar to those described in reference herein to the dynodes. In some instances, stacked MCPs can be used as, or in, X-ray detectors, and by controlling the voltage applied to individual plates, the gain of the detector can be automatically adjusted for each image to provide more clear images.

In certain examples, the MS device 1600 may be hyphenated with one or more other analytical techniques. For example, MS devices may be hyphenated with devices for performing liquid chromatography, gas chromatography, capillary electrophoresis, and other suitable separation techniques. When coupling an MS device to a gas chromatograph, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces may be used so that only a small amount of sample exiting the liquid chromatograph may be introduced into the MS device. Sample exiting from the liquid chromatograph may also be deposited in suitable wires, cups or chambers for transport to the ionization device 1620 of the MS device 1600. In certain examples, the liquid chromatograph may include a thermospray configured to vaporize and aerosolize sample as it passes through a heated capillary tube. Other suitable devices for introducing liquid samples from a liquid chromatograph into a MS device will be readily selected by the person of ordinary skill in the art, given the benefit of this disclosure. In certain examples, MS devices can be hyphenated to each other for tandem mass spectroscopy analyses. For example, one MS device may include a first type of mass analyzer and the second MS device may include a different or similar mass analyzer as the first MS device. In other examples, the first MS device may be operative to isolate the molecular ions, and the second MS device may be operative to fragment/detect the isolated molecular ions. It will be within the ability of the person of ordinary skill in the art, given the benefit of this disclosure, to design hyphenated MS/MS devices at least one of which includes a boost device. Where two or more MS devices are hyphenated to each other, more than a single detector can be used. For example, two or more detectors may be present to permit different types of detection of the ions.

In other embodiments, the detectors described herein may be used in a radioactivity detector to detect radioactive decay that provides ions or particles. In particular, radionuclides that decay by alpha particle emission or Beta particle emission may be directly detected using the detectors described herein. In general, alpha particle decay provides a positively charged particle of a helium nucleus. Heavy atoms such as U-238 decay by alpha emission. In beta particle emission, an electron from the nucleus is ejected. For example I-131 (radioactive iodine) is commonly used to detect thyroid cancer. The I-131 ejects a beta particle which can be detected using one of the detectors described herein.

In certain embodiments, the detectors described herein may be present in a camera configured to detect beta particle emission and reconstruct an image of an object. For example, the detectors described herein can be used in a camera to provide an image, e.g., a digital image, and x-ray images that can be displayed or stored in memory of the camera. In some embodiments, the camera may be configured to detect electron emission from radioisotopes. The camera generally comprises one or more detectors or arrays of detectors in a scan head. In some examples, one or more of the detectors of the array may comprise any one of the detectors described herein, e.g., a detector comprising dynodes electrically coupled to respective electrometers. The scan head is typically positioned or can be moved over or around the object to electrons emission through a gantry, arm or other positioning means, e.g., an arm coupled to one or more motors. A processor, e.g., one present in a computer system, functions to control the position and movement of the scan head and can receive input currents, calculate a mean input current and use such calculated values to construct and/or store images representative of the received electron emissions. The positioning of the detectors can provide spatial resolution as each detector is positioned at a different angle relative to incident emission. As such, saturation of any one detector may occur with other detectors remaining unsaturated or becoming saturated at a different dynode. If desired, the processor can determine whether or not a dynode is saturated at any one detector and then subsequently short other non-saturated dynodes of other detectors at the same dynode. For example, if detector 1 of a six detector array is saturated at dynode 12, then signal amplification at other detectors can be terminated at dynode 12 to provide relative input currents at the same dynode stage of different detectors, which can be used to provide spatial resolution and/or enhanced contrast for the images. By terminating the signal amplification at the same dynodes of different detectors, the use of weighting factors can be omitted and images can be constructed in a simpler manner. Alternatively, weighting factors can be applied based on where saturation occurs at each detector to reconstruct an image. For illustration purposes, one example of a camera is shown in FIG. 18. The camera 1800 is shown as including two detectors 1820 and 1830 in a scan head 1810. Each of the detectors 1820, 1830 may be configured as described herein, e.g., may include dynodes electrically coupled to respective electrometers. If desired, the detectors 1830, 1840 may be configured to be the same or may be different. The detectors 1820, 1830 are each electrically coupled to a processor (not shown) that can receive signals from the detectors for use in constructing an image. The camera 1800 can be used to create 2D images by placing the scan head on or near an object to be imaged and measuring electron emission at the site. Each of the detectors 1820, 1830 is likely to receive different levels of electron emissions, which can be used to contrast an image of the object. For example, the various electron emission intensities can be coded, e.g., coded in greyscale or color-coded, to provide an image representative of the area under the scan head 1810.

Figure 19:
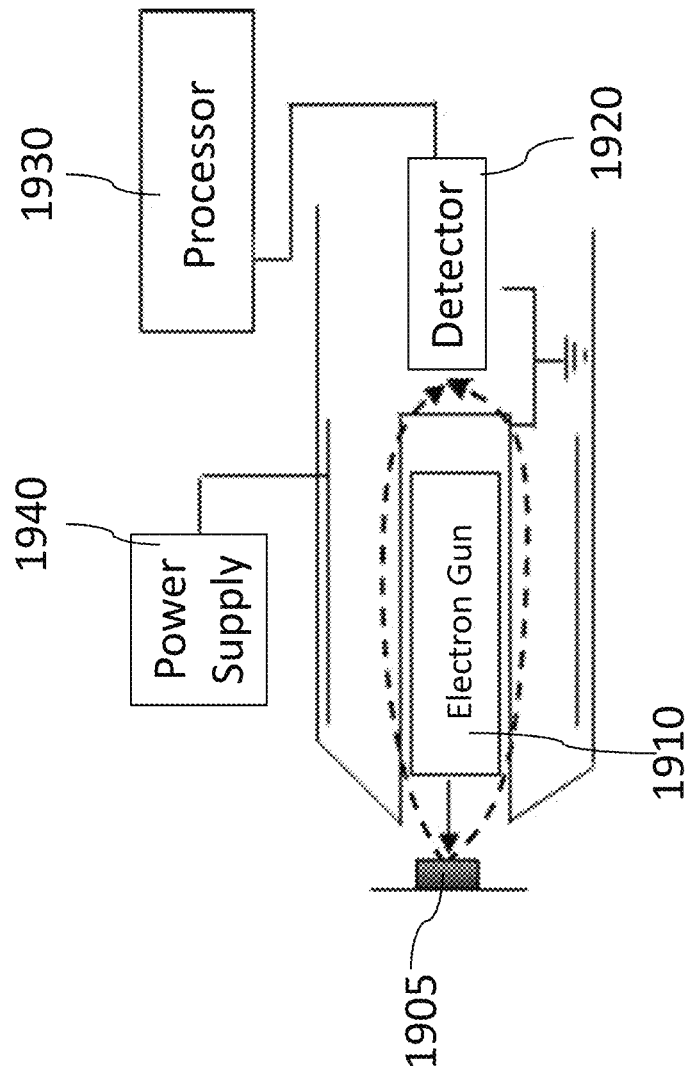
FIG. 19 is an illustration of a system for performing Auger spectroscopy, in accordance with certain examples.

In certain embodiments, the detectors described herein can be used in Auger spectroscopic (AES) applications. Without wishing to be bound by any particular scientific theory, in Auger spectroscopy electrons may be emitted from one or more surfaces after a series of internal events of the material. The electrons which are emitted from the surface can be used to provide a map or image of the surface at different areas. Referring to FIG. 19, a system for AES is shown. The system 1900 comprises an electron source, e.g., an electron gun, 1910, provides electrons to surface 1905. Electrons are emitted from the surface 1905 and deflected into a cylindrical mirror analyzer (CMA) and onto the detector 1920 for amplification. In the detector 1920, Auger electrons are multiplied as described herein in reference to FIGS. 1-12, for example, and the resulting signal is sent to processor 1930. The device can be provided with power from power supply 1940. Collected Auger electrons can be analyzed as a function of incident electron beam energy against the broad secondary electron background spectrum. The detector 1920 may be any of the detectors described herein and can terminate amplification at a saturated dynode in real time without having to change the gain of the detector for different incident energies provided by the electron gun 1910. If desired, AC modulation may be used along with signal derivatization to better analyze the surfaces. Other devices, e.g., scanning Auger microscopes, that measure signals from Auger electrons may also be used. An image can be constructed of a surface and different surface heights can be displayed in different shades of grey to provide a surface map.

Figure 20:
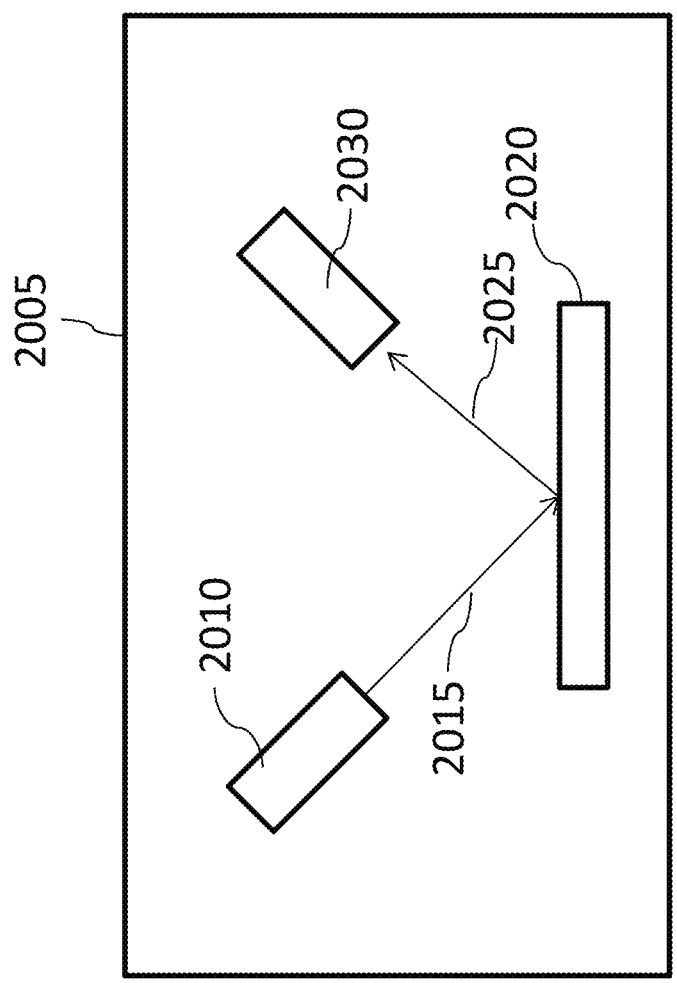
FIG. 20 is an illustration of a system for performing ESCA, in accordance with certain examples.

In other examples, the detectors described herein may be used to perform ESCA (electron spectroscopy for chemical analysis) or X-ray photoelectron spectroscopy. In general ESCA may be performed by irradiating a material with a beam of X-rays while measuring the kinetic energy of the number of electrons that escape for the upper surfaces, e.g., the top 1-10 nm, of the material. Similar to AES, ESCA is often performed under ultra-high vacuum conditions. ESCA can be used to analyze many different types of materials including, but not limited to, inorganic compounds, metal alloys, semiconductors, polymers, elements, catalysts, glasses, ceramics, paints, papers, inks, woods, plant parts, make-up, teeth, bones, medical implants, bio-materials, viscous oils, glues, ion modified materials and many others. Referring to FIG. 20, a block diagram of a typical ESCA system is shown. The system 2000 comprises an X-ray generator 2010, a sample chamber or holder 2020 on which a solid sample is typically added, and a detector 2030 all in a housing 2005. One or more high vacuum pumps are typically present to provide the ultra-high vacuum within the housing 1905. The sample holder 2020 can be coupled to stage or moving platform to permit movement of the sample and analysis of different areas of the sample. The X-ray generator 2010 provides X-rays 2015 that are incident on the surface 2020. Electrons 2025 are ejected and received by the detector 2030. The detector 2030 may include collection lenses, an energy analyzer and other components as desired. The detector may also include one or more of the detectors described herein, e.g., a detector comprising a plurality of dynodes with one or more dynodes electrically coupled to an electrometer, to count the number of electrons arriving at the detector. Non-saturated dynodes can be averaged to determine a mean ion count at a particular site of the sample. In addition, the ability of the detectors described herein to terminate amplification permits operation of the detector at high gain values, which can lead to more sample precise measurements.

Figure 21:
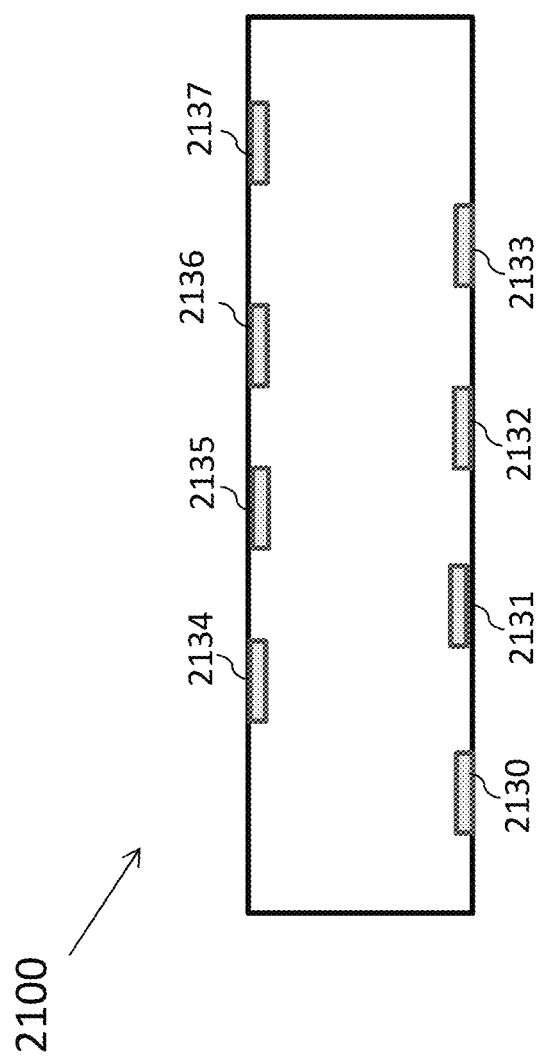
FIG. 21 is a simplified schematic of a continuous electron multiplier, in accordance with certain configurations.

In certain configurations, the circuits and components described herein can be used with a continuous electron multiplier. For example and referring to FIG. 21, a continuous electron multiplier 2100 is shown that comprises surfaces 2130-2137. Surface 2130 is the first surface that can receive ions and provide ejected electrons to surface 2134. Surface 2134 provides ejected electrons to surface 2132. This amplification can continue using the other surfaces. Each surface can be electrically coupled to a respective electrometer similar to the dynode/electrometer pairs described herein. Signals from each surface may also be electrically isolated from signals from other surfaces. Where saturation is detected at a surface, the surface can be shorted out to protect downstream surfaces of the detector 2100. Signals from the various surfaces can be used to calculate currents, e.g., input current or output currents.

In certain embodiments, the detectors described herein can be used in vacuum-ultraviolet (VUV) spectroscopic applications. VUV may be useful, for example, in determining the work functions of various materials used in the semiconductor industry. VUV systems may include components similar to those described in reference to ESCA and Auger spectroscopy. A VUV system may include a light or energy source that can scan its wavelength to provide a relationship between incident energy of the light or energy source and the number of ejected electrons. This relationship can be used to determine the gain of the material.

In some embodiments, the detectors described herein can be used in microscopy applications. For example, the arrangement of atoms on a surface of a material can be imaged using field ion microscopy. The microscope may include a narrow sampling tip coupled to a detector, e.g., a detector comprising a plurality of dynodes where one or more dynodes is electrically coupled to an electrometer or a multichannel plate where one or more channels is coupled to a respective electrometer. An imaging gas, e.g., helium or neon, can be provided to a vacuum chamber and used image the surface. As the probe tip passes over the surface, a voltage is applied to the top, which ionizes the gas on the surface of the top. The gas molecules become positively charged and are repelled from the tip toward the surface. The surface near the tip magnifies the surface as ions are repelled in a direction roughly perpendicular to the surface. A detector can collect these ions, and the calculated ion signal may be used to construct an atomic image of the surface as the tip is scanned from site to site over the surface.

In some examples, the detector described herein can be used in an electron microscope, e.g., a transmission electron microscope, a scanning electron microscope, a reflection electron microscope, a scanning transmission electron microscope, a low-voltage electron microscope or other electron microscopes. In general, an electron microscope provides an electron beam to an image, which scatters the electrons out of the beam. The emergent electron beam can be detected and used to reconstruct an image of the specimen. In particular, the emergent electron beam can be detected using one or more of the detectors described herein, optionally with the use of a scintillant or phosphor screen if desired, to provide for more accurate measurements of the scattered electron beam. The beam can be scanned over the surface of the object and the resulting current measurements at each scan site can be used to provide an image of the object. If desired, a detector array can be present so that spatial resolution may be achieved at each scan site to enhance the image even further.

In some instances, the detectors described herein can be used in atmospheric particle detection. For example, particles incident on the upper atmosphere from solar activity can be measured using the detectors described herein. The particles may be collected and/or focused into the detector for counting. The resultant counts can be used to measure solar activity or measure other astronomical phenomena as desired. For example, the detectors may be part of a particle telescope that measures high-energy particle fluxes or high-energy ion fluxes emitted from the sun or other planetary bodies. The measurements can be used to construct an image of the object, may be used in repositioning satellites or other telecommunications equipment during high levels of solar activity or may be used in other manners.

In certain examples, the detectors described herein can be used in radiation scanners such as those used to image humans or used to image inanimate objects, e.g., to image baggage at screening centers. In particular, one or more detectors can be optically coupled to a non-destructive ion beam. Different components of the item may differentially absorb the ion beam. The resulting measurements can be used to construct an image of the baggage or other item that is measured.

In certain embodiments, the detectors described herein can be used to detect ions. For example, the detector can simultaneously detect an input current signal at each dynode of a plurality of dynodes of an electron multiplier configured to receive ions, and average the detected input current signals at each dynode comprising a measured current input signal above a noise current input signal and below a saturation current input signal to determine a mean electron multiplier input current. If saturation is detected, the detector can terminate signal amplification at a dynode where the saturation current is detected or at a dynode upstream where the saturation current is measured to enhance protection of the detector. In some embodiments, the detector can alter the voltage at a downstream dynode adjacent to the dynode where the saturation current is measured to terminate the signal amplification. The exact methodology used to calculate a mean input current can vary, and in some examples, measured inputs from two, three, four or more dynodes are used and averaged. For example, a mean input current can be calculated by calculating the input currents at all dynodes and discarding calculated input currents below the noise current input signal and above the saturation current input signal, and scaling each non-discarded calculated input current by its respective electron multiplier gain and averaging the scaled input currents to provide the mean electron multiplier input current. In certain embodiments, the ions which are measured can be measured without adjusting the gain of the electron multiplier. For example, a plurality of ions comprising different mass-to-charge ratios can be measured without adjusting the gain of the electron multiplier. In some instances, the number of ions per second may be determined using the detectors described herein. As noted herein, such operations are typically implemented using one or more processors which can receive and send suitable input and outputs to control the detector.

In other embodiments, the detectors described herein may be configured to simultaneously detect an input current signal of at least two internal dynodes of a plurality of dynodes of an electron multiplier configured to receive ions, and average the detected input current signals at each of the at least two internal dynodes comprising a measured current input signal above a noise current input signal and below a saturation current input signal to determine a mean electron multiplier input current. If a saturated dynode is detected, then signal amplification at a dynode where a saturation current is measured can be terminated or termination may occur at a dynode downstream or upstream from the dynode where saturation is detected. As discussed herein, it is not necessary to measure the input current at each dynode but instead there may be simultaneous detection of an input current signal at every other internal dynode of the plurality of dynodes, at every third internal dynode of the plurality of dynodes, or other selected spacing.

In some embodiments, the detectors described herein may be configured to separately control a bias voltage in each dynode of an electron multiplier comprising a plurality of dynodes. As noted herein, by separately controlling the bias voltage in the dynodes, changes in current during amplification do not substantially affect the bias voltage. For example, the bias voltage can be controlled by regulating the dynode voltage to be substantially constant with increasing electron current. Where such bias voltage are separately controlled, a mean input current can be calculated by calculating input currents at selected dynodes of the plurality of dynodes, discarding calculated input currents below a noise current input level and above the saturation current input level, scaling each non-discarded calculated input current by its respective gain, and averaging the scaled input currents to determine a mean input current.

In other embodiments, the detectors described herein can be configured to independently measure an input current at each of a plurality of dynodes of an electron multiplier. In some examples, the method comprises calculating input currents at each dynode of the plurality of dynodes, discarding calculated input currents below a noise current input level and above the saturation current input level, scaling each non-discarded calculated input current by its respective gain, and averaging the scaled input currents to determine a mean input current.

In some examples, the detectors described herein can be used to analyze a sample by amplifying an ion signal from the sample by independently measuring an input current at two or more of a plurality of dynodes in an electron multiplier comprising the plurality of dynodes. In certain embodiments, the method comprises calculating input currents at each of the two or more dynodes of the plurality of dynodes, discarding calculated input currents below a noise current input level and above the saturation current input level, scaling each non-discarded calculated input current by its respective gain, and averaging the scaled input currents to determine a mean input current. In some embodiments, the detector can be configured to measure input currents from every other dynode of the plurality of dynodes or from other selected spacing of dynodes.

In certain examples, the detectors described herein may be part of a system which includes a plurality of dynodes, at least one electrometer electrically coupled to one of the plurality of dynodes, and a processor electrically coupled to the at least one electrometer, the processor configured to determine a mean input current from input current measurements measured by the electrometer. If desired, the system can include a second electrometer electrically coupled to a dynode other than the dynode electrically coupled to the electrometer. In other configurations, each of the plurality of dynodes is electrically coupled to a respective electrometer. In some instances, the processor may be configured to determine the mean input current by calculating input currents at the at least one dynode of the plurality of dynodes, discarding calculated input currents below a noise current input level and above the saturation current input level, scaling each non-discarded calculated input current by its respective gain, and averaging the scaled input currents to determine a mean input current. In other instances, the processor may be configured to determine the mean input current by calculating input currents at the dynode electrically coupled to the electrometer and at the dynode electrically coupled to the second electrometer, discarding calculated input currents below a noise current input level and above the saturation current input level, scaling each non-discarded calculated input current by its respective gain, and averaging the scaled input currents to determine a mean input current. In yet different configurations, the processor can be configured to determine the mean input current by calculating input currents at each dynode of the plurality of dynodes, discarding calculated input currents below a noise current input level and above the saturation current input level, scaling each non-discarded calculated input current by its respective gain, and averaging the scaled input currents to determine a mean input current.

In certain embodiments, the detectors described herein, and their methods of using them can be implemented using a computer or other device that includes a processor. The computer system typically includes at least one processor electrically coupled to one or more memory units to receive signals from the electrometers. The computer system may be, for example, a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be located on a single computer or may be distributed among a plurality of computers attached by a communications network. A general-purpose computer system may be configured, for example, to perform any of the described functions including but not limited to: dynode voltage control, measurement of current inputs (or outputs), calculation of a mean input current, image generation or the like. It should be appreciated that the system may perform other functions, including network communication, and the technology is not limited to having any particular function or set of functions.

Various aspects of the detectors and methods may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically is electrically coupled to a power source and/or the dynodes (or channels) such that electrical signals may be provided to and from the power source and/or dynodes (or channels) to provide desired signal amplification. The computer system may also include one or more input devices, for example, a keyboard, mouse, trackball, microphone, touch screen, manual switch (e.g., override switch) and one or more output devices, for example, a printing device, display screen, speaker. In addition, the computer system may contain one or more interfaces that connect the computer system to a communication network (in addition or as an alternative to the interconnection device). The computer system may also include one more single processors, e.g., digital signal processors, which can be present on a printed circuit board or may be present on a separate board or device that is electrically coupled to the printed circuit board through a suitable interface, e.g., a serial ATA interface, ISA interface, PCI interface or the like.

In certain embodiments, the storage system of the computer typically includes a computer readable and writeable nonvolatile recording medium in which signals are stored that define a program to be executed by the processor or information stored on or in the medium to be processed by the program. For example, dynode bias voltages for a particular routine, method or technique may be stored on the medium. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system.

In certain embodiments, the computer system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the computer system described above or as an independent component. Although a computer system is described by way of example as one type of computer system upon which various aspects of the technology may be practiced, it should be appreciated that aspects are not limited to being implemented on the described computer system. Various aspects may be practiced on one or more computers having a different architecture or components. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7 or Windows 8 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software is configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A mass spectrometer comprising:
a sample introduction system;
an ion source fluidically coupled to the sample introduction system;
a mass analyzer fluidically coupled to the ion source;
a detector fluidically coupled to the mass analyzer, in which the detector comprises an electron multiplier comprising a plurality of dynodes each electrically coupled to a respective electrometer; and
a first processor electrically coupled to each respective electrometer, in which the first processor is configured to measure an output signal from each dynode of the plurality of dynodes and to terminate signal amplification at a saturated dynode of the plurality of dynodes.

2. The mass spectrometer of claim 1, in which the first processor is configured to measure the input current at each respective dynode.

3. The mass spectrometer of claim 1, in which the first processor is configured to calculate a mean input current using received input current signals from each dynode of the electron multiplier and using the gain of each respective dynode.

4. The mass spectrometer of claim 1, in which the first processor is configured to calculate a gain of a first dynode by comparing a current of the first dynode to a current of a dynode immediately upstream of the first dynode.

5. The mass spectrometer of claim 1, in which each electrometer is electrically coupled to a signal converter to provide simultaneous digital signals to the processor from each of the plurality of dynodes.

6. The mass spectrometer of claim 5, in which the signal converter comprises an analog-to-digital converter.

7. The mass spectrometer of claim 6, in which the detector further comprises a respective power converter electrically coupled to each electrometer and analog-to-digital converter pair.

8. The mass spectrometer of claim 1, in which the detector is configured to measure all dynode currents simultaneously.

9. The mass spectrometer of claim 1, in which the detector is configured to prevent a current overload at each dynode.

10. The mass spectrometer of claim 9, in which the detector is configured to alter the voltage at the saturated dynode or a dynode downstream from the saturated dynode.

11. The mass spectrometer of claim 10, in which the detector is configured to invert the polarity of the voltage of the downstream dynode.

12. The mass spectrometer of claim 9, in which the detector is configured to prevent any substantial secondary electron emission from a downstream dynode adjacent to the saturated dynode.

13. The mass spectrometer of claim 1, in which dynode to dynode voltage is substantially constant with a change of electron current at each dynode.

14. The mass spectrometer of claim 1, in which dynamic range of ion current measurement is greater than $10^{10}$ for a 100 KHz reading.

15. The mass spectrometer of claim 1, in which the first processor is configured to calculate a mean electron multiplier input current by calculating input currents at all dynodes of the plurality of dynodes and discarding calculated input currents below a noise current and above a saturation current.

16. The mass spectrometer of claim 15, in which the first processor is configured to scale each non-discarded calculated input currents using the respective electron multiplier gain and average the scaled input currents to provide the mean electron multiplier input current.

17. A mass spectrometer comprising:
a sample introduction system;
an ion source fluidically coupled to the sample introduction system;
a mass analyzer fluidically coupled to the ion source;
a detector fluidically coupled to the mass analyzer, in which the detector comprises a single-stage electron multiplier comprising a plurality of dynodes, in which at least one internal dynode of the plurality of dynodes is electrically coupled to an electrometer; and
a first processor electrically coupled to each of the plurality of dynodes, in which the first processor is configured to measure a signal from each dynode of the plurality of dynodes and to terminate signal amplification at a saturated dynode of the plurality of dynodes.

18. The mass spectrometer of claim 17, further comprising at least one additional electrometer electrically coupled to one of the plurality of dynodes.

19. The mass spectrometer of claim 18, wherein the first processor is configured to measure the input or output current into each respective dynode.

20. The mass spectrometer of claim 17, further comprising a respective electrometer electrically coupled to each dynode of the plurality of dynodes.

21. The mass spectrometer of claim 20, further comprising a respective power converter electrically coupled to each respective electrometer.

* * * * *